(12) United States Patent
Young et al.

(10) Patent No.: US 10,339,692 B2
(45) Date of Patent: Jul. 2, 2019

(54) FOVEAL ADAPTATION OF PARTICLES AND SIMULATION MODELS IN A FOVEATED RENDERING SYSTEM

(71) Applicant: Sony Interactive Entertainment Inc., Tokyo (JP)

(72) Inventors: Andrew Young, San Mateo, CA (US); Chris Ho, San Mateo, CA (US); Jeffrey Roger Stafford, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/721,580

(22) Filed: Sep. 29, 2017

(65) Prior Publication Data

US 2018/0357810 A1 Dec. 13, 2018

Related U.S. Application Data

(60) Provisional application No. 62/517,837, filed on Jun. 9, 2017.

(51) Int. Cl.
  *G06T 11/40* (2006.01)
  *G06T 15/00* (2011.01)
  *G06F 3/01* (2006.01)

(52) U.S. Cl.
  CPC ............ *G06T 15/005* (2013.01); *G06F 3/013* (2013.01); *G06T 11/40* (2013.01); *G06T 2210/36* (2013.01); *G06T 2210/56* (2013.01); *G06T 2215/16* (2013.01)

(58) Field of Classification Search
  CPC ...................... G06T 17/00–30; G06T 2210/56
  See application file for complete search history.

(56) References Cited

U.S. PATENT DOCUMENTS

H001812 H  *  11/1999  Arcuri ........................... 345/428
2012/0148162 A1 *  6/2012  Zhang ....................... G06T 7/11
                                                                        382/195

OTHER PUBLICATIONS

Meng, Fang, and Hongbin Zha. "Streaming Transmission of Point-Sampled Geometry Based on View-Dependent Level-of-Detail." Proc. Fourth Int. Conf. on 3-D Digital Imaging and Modeling. Oct. 2003. (Year: 2003).*

(Continued)

*Primary Examiner* — Daniel F Hajnik
(74) *Attorney, Agent, or Firm* — Penilla IP, APC

(57) ABSTRACT

A method for implementing a graphics pipeline. The method includes generating a system of particles creating an effect in a virtual scene, the system of particles comprising a plurality of particle geometries. The method includes determining a subsystem of particles from the system of particles, the subsystem of particles comprising a subset of particle geometries taken from the plurality of particle geometries. The method includes determining a foveal region when rendering an image of the virtual scene, wherein the foveal region corresponds to where an attention of a user is directed. The method includes determining that at least one portion of the effect is located in the peripheral region for the image. The method includes rendering the subsystem of particles to generate the effect.

19 Claims, 12 Drawing Sheets

(56) References Cited

OTHER PUBLICATIONS

Alexa, Marc, et al. "Point-based computer graphics." ACM SIGGRAPH 2004 Course Notes. ACM, 2004; pp. 34-44. (Year: 2004).*
Botsch, M., and L. Kobbelt. "High-quality point-based rendering on modern GPUs." Computer Graphics and Applications, 2003. Proceedings. 11th Pacific Conference on. IEEE, 2003. (Year: 2003).*

* cited by examiner

FOVEAL ADAPTATION OF PARTICLES AND SIMULATION MODELS IN A FOVEATED RENDERING SYSTEM

CLAIM OF PRIORITY

The present application claims priority to and the benefit of the commonly owned, U.S. provisional patent application Ser. No. 62/517,837, filed on Jun. 9, 2017, entitled "FOVEAL ADAPTATION OF PARTICLES AND SIMULATION MODELS IN A FOVEATED RENDERING SYSTEM," which is herein incorporated by reference in its entirety.

TECHNICAL FIELD

The present disclosure is related to video games or gaming applications. Among other things, this disclosure describes methods and systems for the selective rendering of a full or reduced number of particles in a particle system for use in a foveated rendering system.

BACKGROUND OF THE DISCLOSURE

Video gaming has increasingly become more popular with the advancement of video game technology. For example, high powered graphics processors provide an unbelievably viewing and interactive experience when playing a video game. In addition, displays are being designed with higher and higher resolutions. For example, present technology includes displays having 2K resolution (e.g., 2.2 megapixels over 2048×1080 pixels) with an aspect ratio of approximately 19:10. Other displays having 4K UHD (Ultra high definition) resolution (e.g., 8.2 megapixels over 3840×2160 pixels) with an aspect ratio of 16:9 are now pushing into the market and is expected to gain traction. Increased graphics processing capabilities along with high resolution displays provide for a heretofore unbelievable viewing experience for the user, especially when playing a video game and gaming engine designed to take advantage of the higher resolution displays.

Pushing rendered images/frames to a high resolution display also requires increased bandwidth capabilities, such as between the rendering engine and the display. In most cases, a wired connection should be able to handle the required bandwidth supporting the display. However, gaming systems increasingly are configured with a wireless connection that may provide a bottleneck when pushing data to the display. For instance, a wireless connection may be established between a gaming console local to the user and the display. In these cases, the wireless connection may not be robust enough to handle the required bandwidth to fully take advantage of the higher resolution displays, such that the video game as displayed may be interrupted (as the buffer is filling up) in order to display the entire video sequence as rendered. In some cases, the video game processing may be throttled in order to match the lower bandwidth of the wireless connection to the display, such that the video frames may be rendered at lower resolutions in order to push video data over the wireless connection without interruption; however, by throttling the processing, the user is denied the full gaming experience with higher resolution graphics.

It would be beneficial to modify the graphics processing in order for the user to achieve a high level of satisfaction for the user, especially when playing a video game.

It is in this context that embodiments of the disclosure arise.

SUMMARY

Embodiments of the present disclosure relate to foveated rendering configured to display portions of images in a foveal region with high resolution and portions outside the foveal region with lower resolution. In particular, through a simulation model particle systems are widely used to create physical effects like fire, smoke, cloth, and water. Particle systems are also used in many non-physical effects such as magical spells. These particle systems can range in complexity from 10 particles to 100,000 or more particles depending on the desired effect. The computation for simulating and rendering the particles can be quite expensive. When the user is not actively looking at the particle system (i.e. the particle system effect is drawn in the peripheral region or peripheral region), the particle system could potentially be represented by fewer number of particles when rendered that are scaled (e.g., larger) and darkened (e.g., modify alpha values) to achieve a similar perceptible effect. In that manner, the total bandwidth for the sequence of video frames being displayed is reduced, for example due in part to less complex images. Further, the sequence of video frames can be delivered (e.g., over wired or wireless connections) in real time with minimal or no latency because the computation complexity is reduced.

In one embodiment, a method for implementing a graphics pipeline is disclosed. The method includes generating a system of particles creating an effect in a virtual scene, the system of particles comprising a plurality of particle geometries. The method further includes determining a subsystem of particles from the system of particles, the subsystem of particles comprising a subset of particle geometries taken from the plurality of particle geometries. The method includes determining a foveal region when rendering an image of the virtual scene, wherein the foveal region corresponds to where an attention of a user is directed. the method includes determining that at least one portion of the effect is located in the peripheral region for the image. The method includes rendering the subsystem of particles to generate the effect.

In still another embodiment, a computer system is disclosed. The computer system including a processor and memory, wherein the memory is coupled to the processor and having stored therein instructions that, if executed by the computer system, cause the computer system to execute a method for implementing a graphics pipeline. The method includes generating a system of particles creating an effect in a virtual scene, the system of particles comprising a plurality of particle geometries. The method further includes determining a subsystem of particles from the system of particles, the subsystem of particles comprising a subset of particle geometries taken from the plurality of particle geometries. The method includes determining a foveal region when rendering an image of the virtual scene, wherein the foveal region corresponds to where an attention of a user is directed. the method includes determining that at least one portion of the effect is located in the peripheral region for the image. The method includes rendering the subsystem of particles to generate the effect.

In another embodiment, a non-transitory computer-readable medium storing a computer program for implementing a graphics pipeline is disclosed. The computer-readable medium includes program instructions for generating a system of particles creating an effect in a virtual scene, the system of particles comprising a plurality of particle geometries. The computer-readable medium includes program instructions for determining a subsystem of particles from the system of particles, the subsystem of particles comprising a subset of particle geometries taken from the plurality of particle geometries. The computer-readable medium includes program instructions for determining a foveal region when rendering an image of the virtual scene, wherein the foveal region corresponds to where an attention of a user is directed. The computer-readable medium includes program instructions for determining that at least one portion of the effect is located in the peripheral region for the image. The computer-readable medium includes program instructions for rendering the subsystem of particles to generate the effect.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe a graphics processor of a video rendering system that is configured to perform foveated rendering, wherein portions of images in a foveal region may be rendered with high resolution and portions outside the foveal region may be rendered with lower resolution. In particular, particle system simulation is rendered using a full complement of particles or a subsystem of particles depending on whether the effect of the particle system is located within a foveal region or peripheral region of an image as displayed. In some embodiments, the foveated rendering is performed within or for the purposes of displaying images within a head mounted display (HMD).

With the above general understanding of the various embodiments, example details of the embodiments will now be described with reference to the various drawings.

Throughout the specification, the reference to "video game" or "gaming application" is meant to represent any type of interactive application that is directed through execution of input commands. For illustration purposes only, an interactive application includes applications for gaming, word processing, video processing, video game processing, etc. Further, the terms video game and gaming application are interchangeable.

Figure 1A:
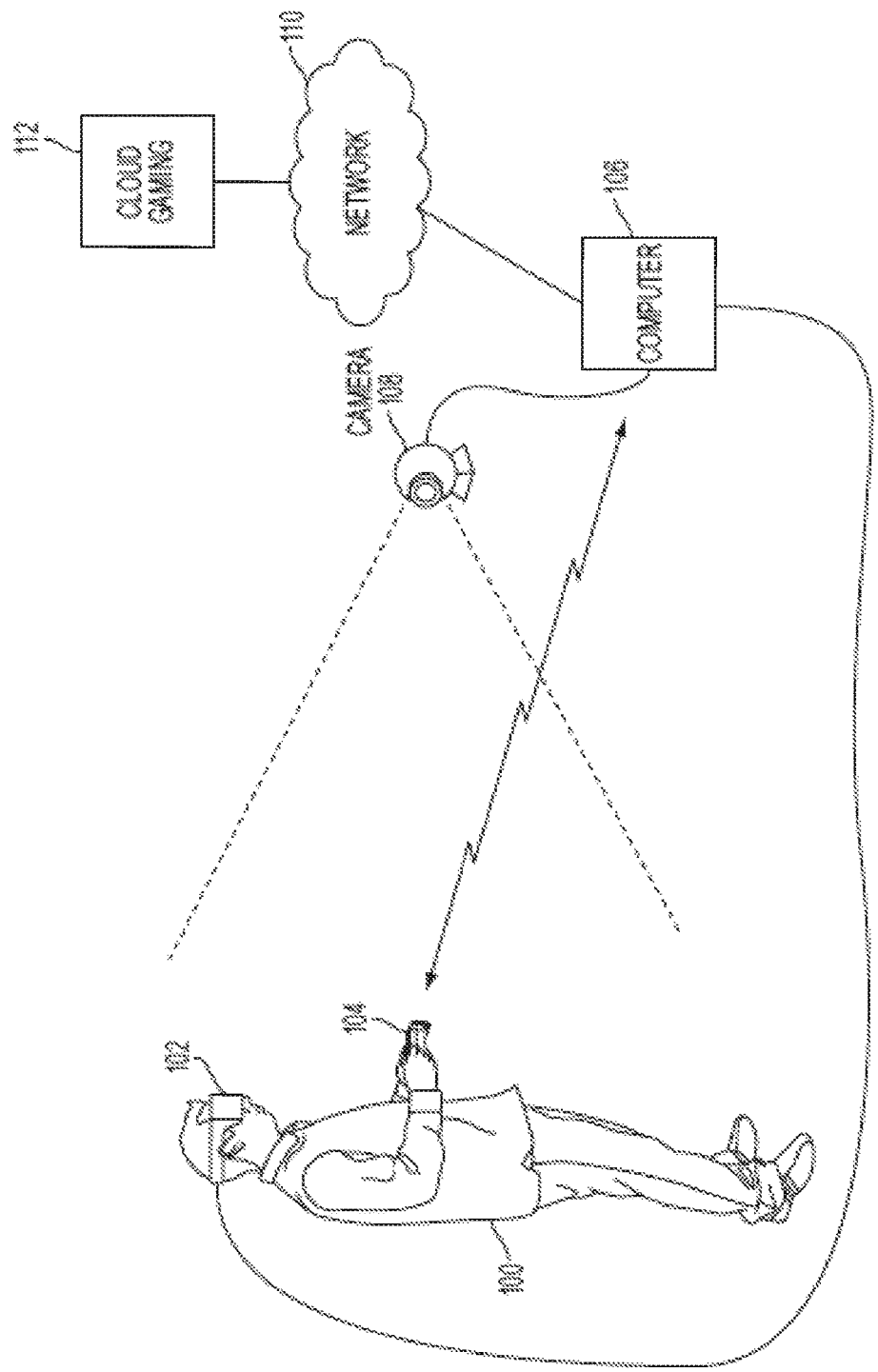
FIG. 1A illustrates a system configured for providing an interactive experience with VR content, in accordance with one embodiment of the present disclosure.

FIG. 1A illustrates a system for interactive gameplay of a video game, in accordance with an embodiment of the invention. A user 100 is shown wearing an HMD 102, wherein the HMD 102 is worn in a manner similar to glasses, goggles, or a helmet, and is configured to display a video game from an interactive video game or other content from interactive application, to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user. Though FIGS. 1A-1B and in other figures are shown using HMDs for displaying rendered images, embodiments of the present invention are well suited for performing foveated rendering in any display device, wherein the foveated rendering includes simulating and/or rendering a full complement of particles or subsystem of particles in an image based on the location of the rendered effect of the particle system in relation to a foveal region, and displaying the rendered images on any display.

In one embodiment, HMD 102 is configurable to display images configured with foveated rendering, wherein portions of images in a foveal region are displayed with high resolution and portions outside the foveal region are displayed with lower resolution. In particular, particle systems are simulated and/or rendered differently depending on whether the effect generated by the particle system is displayed inside or outside a foveal region of an image as displayed. For example, a particle system that is inside the foveal region is simulated and/or rendered using a full complement of particles in the particle system. A particle system that is outside the foveal region (i.e., in the peripheral region) is simulated and/or rendered using a subsystem of particles. As such, instead of computing all the particles in a particle system located in a peripheral region, only a subsystem of particles are simulated and/or rendered, thereby lessening the computation required for rendering the effect produced by the particle system in a corresponding image. Also, each image containing a particle system rendered using a subsystem of particles and displayed outside the foveal region require less defining data than images containing a particle system that is simulated and/or rendered using the full complement of particles of the particle system. In that manner, the total bandwidth for the sequence of video frames being displayed is reduced.

In one embodiment, the HMD 102 can be connected to a computer or gaming console 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102. The computer 106 is not restricted to executing a video game but may also be configured to execute an interactive application, which outputs VR content 191 for rendering by the HMD 102. In one embodiment, computer 106 performs the simulation and/or rendering of a particle system using a subsystem of particles when displaying the effect of the particle system in a peripheral region of an image.

The user 100 may operate a controller 104 to provide input for the video game. Additionally, a camera 108 can be configured to capture one or more images of the interactive environment in which the user 100 is located. These captured images can be analyzed to determine the location and movements of the user 100, the HMD 102, and the controller 104. In one embodiment, the controller 104 includes a light or other marker elements which can be tracked to determine its location and orientation. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the controller 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas the haptic feedback data is used to generate a vibration feedback command, which is provided to the controller 104.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage network traffic. The connections to the network by the HMD 102, controller 104, and camera (i.e., image capture device) 108 may be wired or wireless.

In yet another embodiment, the computer 106 may execute a portion of the video game, while the remaining portion of the video game may be executed on a cloud gaming provider 112. In other embodiments, portions of the video game may also be executed on HMD 102. For example, a request for downloading the video game from the computer 106 may be serviced by the cloud gaming provider 112. While the request is being serviced, the cloud gaming provider 112 may execute a portion of the video game and provide game content to the computer 106 for rendering on the HMD 102. The computer 106 may communicate with the cloud gaming provider 112 over a network 110. Inputs received from the HMD 102, the controller 104 and the camera 108, are transmitted to the cloud gaming provider 112, while the video game is downloading on to the computer 106. The cloud gaming provider 112 processes the inputs to affect the game state of the executing video game. The output from the executing video game, such as video data, audio data, and haptic feedback data, is transmitted to the computer 106 for onward transmission to the respective devices.

Once the video game has been completely downloaded to the computer 106, the computer 106 may execute the video game and resume game play of the video game from where it was left off on the cloud gaming provider 112. The inputs from the HMD 102, the controller 104, and the camera 108 are processed by the computer 106, and the game state of the video game is adjusted, in response to the inputs received from the HMD 102, the controller 104, and the camera 108. In such embodiments, a game state of the video game at the computer 106 is synchronized with the game state at the cloud gaming provider 112. The synchronization may be done periodically to keep the state of the video game current at both the computer 106 and the cloud gaming provider 112. The computer 106 may directly transmit the output data to the relevant devices. For example, video and audio streams are provided to the HMD 102, whereas the haptic feedback data is used to generate a vibration feedback command, which is provided to the controller 104.

Figure 1B:
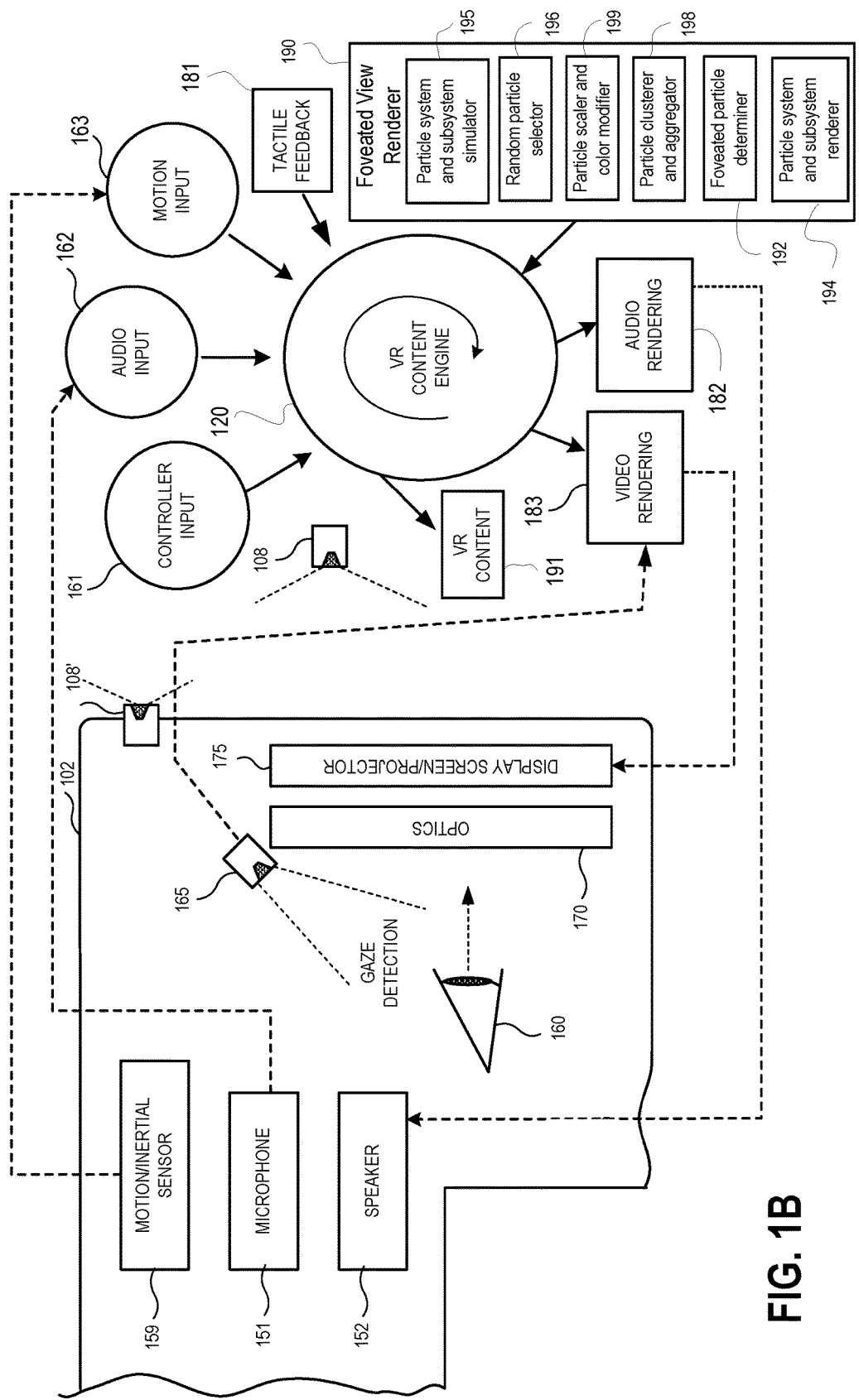
FIG. 1B conceptually illustrates the function of a HMD in conjunction with an executing video game, in accordance with an embodiment of the invention.

FIG. 1B conceptually illustrates the function of a HMD 102 in conjunction with the generation of VR content 191 (e.g., execution of an application and/or video game, etc.), in accordance with an embodiment of the invention. In some implementations, the VR content engine 120 is being executed on a computer 106 (not shown) that is communicatively coupled to the HMD 102. The computer may be local to the HMD (e.g., part of local area network) or may be remotely located (e.g., part of a wide area network, a cloud network, etc.) and accessed via a network. The communication between the HMD 102 and the computer 106 may follow a wired or a wireless connection protocol. For example, the VR content engine 120 executing an application may be a video game engine executing a video game, and is configured to receive inputs to update a game state of the video game. The following description of FIG. 1B is described within the context of the VR content engine 120 executing a video game, for purposes of brevity and clarity, and is intended to represent the execution of any application capable of generating VR content 191. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine 120 receives, by way of example, controller input 161, audio input 162 and motion input 163. The controller input 161 may be defined from the operation of a gaming controller separate from the HMD 102, such as a hand-held gaming controller 104 (e.g. Sony DUALSHOCK®4 wireless controller, Sony PlayStation® Move motion controller) or wearable controllers, such as wearable glove interface controller, etc. By way of example, controller input 161 may include directional inputs, button presses, trigger activation, movements, gestures or other kinds of inputs processed from the operation of a gaming controller. The audio input 162 can be processed from a microphone 151 of the HMD 102, or from a microphone included in the image capture device 108 or elsewhere within the local system environment. The motion input 163 can be processed from a motion sensor 159 included in the HMD 102, or from image capture device 108 as it captures images of the HMD 102. The VR content engine 120 (e.g., executing a gaming application) receives inputs which are processed according to the configuration of the game engine to update the game state of the video game. The engine 120 outputs game state data to various rendering modules which process the game state data to define content which will be presented to the user.

In the illustrated embodiment, a video rendering module 183 is defined to render a video stream for presentation on the HMD 102. Foveated view renderer 190 is configured to render foveated images in conjunction with and/or independent of video rendering module 183. Additionally, the functionality provided by the foveated view renderer 190 may be incorporated within the video rendering module 183, in embodiments. In particular, foveated view renderer 190 is configured to perform foveated rendering, wherein portions of images in a foveal region with high resolution and portions outside the foveal region with lower resolution. More particularly, a particle system is simulated and/or rendered differently depending on the displayed location of the corresponding effect in relation to a foveal region of an image. For example, a particle system that is displayed inside the foveal region is simulated and/or rendered using a full complement of particles in the particle system. A particle system that is displayed in the peripheral region is simulated and/or rendered using a subsystem of particles. The foveated particle and/or fragment determiner 192 is configured to determine whether a particle and/or particle system being rendered is displayed inside or outside a foveal region. The particle system and/or subsystem simulator 195 is configured to simulate the effect using the full complement of particles in the particle system, or simulate the effect using the subsystem of particles in various embodiments. For example, for particle systems having limited particles (e.g., less than ten thousand), the full complement of particles in the particle system is simulated regardless of whether the effect is in the foveated or peripheral region. However when the effect generated by the particle system is displayed in the peripheral region the subsystem of particles is then rendered. In this case, the subsystem of particles may be generated by the random particle selector 196. Also, for particle systems having larger amounts of particles (e.g., more than ten thousand), the subsystem of particles is simulated when the effect generated by the particle system is displayed in the peripheral region, and thereafter rendered using the output from the same subsystem of particles. The subsystem of particles in this case may be determined by the particle clusterer and aggregator 198. The particle system and subsystem renderer 194 is configured to render the full complement of particles in a particle system when the effect generated by the particle system is displayed in the foveal region, and to render a subsystem of particles when the effect is displayed in a peripheral region. The particle scaler and color modifier 199 is configured to scale particles in the subsystem of particles, and modify the color of the particles to achieve the same or similar perceivable effect by the user of the of the particle system. For example, each particle in the subsystem is scaled to a larger size (e.g., based on a reduction ratio) and darkened (e.g., modifying alpha values based on the reduction ratio). Components and/or functions of the foveated view renderer 190 may be performed within a CPU or GPU, or combination thereof.

A lens of optics 170 in the HMD 102 is configured for viewing the VR content 191. A display screen 175 is disposed behind the lens of optics 170, such that the lens of optics 170 is between the display screen 175 and an eye 160 of the user, when the HMD 102 is worn by the user. In that manner, the video stream may be presented by the display screen/projector mechanism 175, and viewed through optics 170 by the eye 160 of the user. An HMD user may elect to interact with the interactive VR content 191 (e.g., VR video source, video game content, etc.) by wearing the HMD and selecting a video game for game play, for example. Interactive virtual reality (VR) scenes from the video game are rendered on the display screen 175 of the HMD. In that manner, the HMD allows the user to completely immerse in the game play by provisioning display mechanism of the HMD in close proximity to the user's eyes. The display regions defined in the display screen of the HMD for rendering content may occupy large portions or even the entirety of the field of view of the user. Typically, each eye is supported by an associated lens of optics 170 which is viewing one or more display screens.

An audio rendering module 182 is configured to render an audio stream for listening by the user. In one embodiment, the audio stream is output through a speaker 152 associated with the HMD 102. It should be appreciated that speaker 152 may take the form of an open air speaker, headphones, or any other kind of speaker capable of presenting audio.

In one embodiment, a gaze tracking camera 165 is included in the HMD 102 to enable tracking of the gaze of the user. Although only one gaze tracking camera 165 is included, it should be noted that more than one gaze tracking camera may be employed to track the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail, higher resolution through foveated rendering as provided by foveated view renderer 190, higher resolution of a particle system effect displayed in the foveal region, lower resolution of a particle system effect displayed outside the foveal region, or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 165, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 181 is configured to provide signals to tactile feedback hardware included in either the HMD 102 or another device operated by the HMD user, such as a controller 104. The tactile feedback may take the form of various kinds of tactile sensations, such as vibration feedback, temperature feedback, pressure feedback, etc.

Figure 2A:
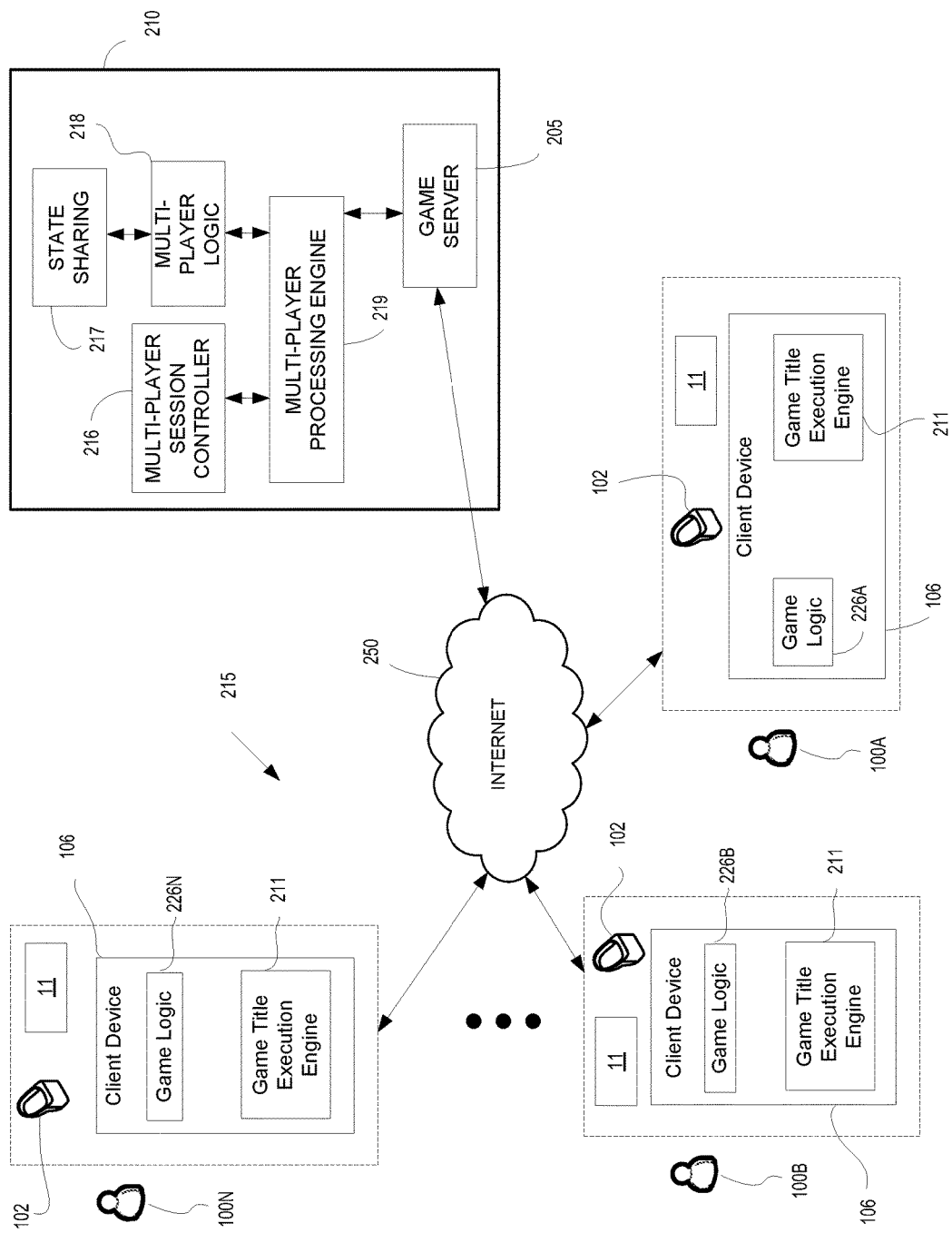
FIG. 2A illustrates a system providing gaming control to one or more users playing one or more gaming applications that are executing locally to the corresponding user, in accordance with one embodiment of the present disclosure.

FIG. 2A illustrates a system 200A providing gaming control to one or more users playing one or more gaming applications that are executing locally to the corresponding user, and wherein back-end server support (e.g., accessible through game server 205) may be configured to support a plurality of local computing devices supporting a plurality of users, wherein each local computing device may be executing an instance of a video game, such as in a single-player or multi-player video game. For example, in a multi-player mode, while the video game is executing locally, the cloud game network concurrently receives information (e.g., game state data) from each local computing device and distributes that information accordingly throughout one or more of the local computing devices so that each user is able to interact with other users (e.g., through corresponding characters in the video game) in the gaming environment of the multi-player video game. In that manner, the cloud game network coordinates and combines the game plays for each of the users within the multi-player gaming environment. Referring now to the drawings, like referenced numerals designate identical or corresponding parts.

As shown in FIG. 2A, a plurality of users 215 (e.g., user 100A, user 100B . . . user 100N) is playing a plurality of gaming applications, wherein each of the gaming applications is executed locally on a corresponding client device 106 (e.g., game console) of a corresponding user. Each of the client devices 106 may be configured similarly in that local execution of a corresponding gaming application is performed. For example, user 100A may be playing a first gaming application on a corresponding client device 106, wherein an instance of the first gaming application is executed by a corresponding game title execution engine 211. Game logic 226A (e.g., executable code) implementing the first gaming application is stored on the corresponding client device 106, and is used to execute the first gaming application. For purposes of illustration, game logic may be delivered to the corresponding client device 106 through a portable medium (e.g., flash drive, compact disk, etc.) or through a network (e.g., downloaded through the internet 250 from a gaming provider). In addition, user 100B is playing a second gaming application on a corresponding client device 106, wherein an instance of the second gaming application is executed by a corresponding game title execution engine 211. The second gaming application may be identical to the first gaming application executing for user 100A or a different gaming application. Game logic 226B (e.g., executable code) implementing the second gaming application is stored on the corresponding client device 106 as previously described, and is used to execute the second gaming application. Further, user 100N is playing an Nth gaming application on a corresponding client device 106, wherein an instance of the Nth gaming application is executed by a corresponding game title execution engine 211. The Nth gaming application may be identical to the first or second gaming application, or may be a completely different gaming application. Game logic 226N (e.g., executable code) implementing the third gaming application is stored on the corresponding client device 106 as previously described, and is used to execute the Nth gaming application.

As previously described, client device 106 may receive input from various types of input devices, such as game controllers, tablet computers, keyboards, gestures captured by video cameras, mice touch pads, etc. Client device 106 can be any type of computing device having at least a memory and a processor module that is capable of connecting to the game server 205 over network 150. Also, client device 106 of a corresponding user is configured for generating rendered images executed by the game title execution engine 211 executing locally or remotely, and for displaying the rendered images on a display (e.g., display 11, HMD 102, etc.). For example, the rendered images may be associated with an instance of the first gaming application executing on client device 106 of user 100A. For example, a corresponding client device 106 is configured to interact with an instance of a corresponding gaming application as executed locally or remotely to implement a game play of a corresponding user, such as through input commands that are used to drive game play. Some examples of client device 106 include a personal computer (PC), a game console, a home theater device, a general purpose computer, mobile computing device, a tablet, a phone, or any other types of computing devices that can interact with the game server 205 to execute an instance of a video game.

In one embodiment, client device 106 is operating in a single-player mode for a corresponding user that is playing a gaming application. In another embodiment, multiple client devices 106 are operating in a multi-player mode for corresponding users that are each playing a specific gaming application. In that case, back-end server support via the game server may provide multi-player functionality, such as through the multi-player processing engine 219. In particular, multi-player processing engine 219 is configured for controlling a multi-player gaming session for a particular gaming application. For example, multi-player processing engine 219 communicates with the multi-player session controller 216, which is configured to establish and maintain communication sessions with each of the users and/or players participating in the multi-player gaming session. In that manner, users in the session can communicate with each other as controlled by the multi-player session controller 216.

Further, multi-player processing engine 219 communicates with multi-player logic 218 in order to enable interaction between users within corresponding gaming environments of each user. In particular, state sharing module 217 is configured to manage states for each of the users in the multi-player gaming session. For example, state data may include game state data that defines the state of the game play (of a gaming application) for a corresponding user at a particular point. For example, game state data may include game characters, game objects, game object attributes, game attributes, game object state, graphic overlays, etc. In that manner, game state data allows for the generation of the gaming environment that exists at the corresponding point in the gaming application. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the video game from that point. Game state data may be stored in database (not shown), and is accessible by state sharing module 217.

Further, state data may include user saved data that includes information that personalizes the video game for the corresponding player. This includes information associated with the character played by the user, so that the video game is rendered with a character that may be unique to that user (e.g., location, shape, look, clothing, weaponry, etc.). In that manner, the user saved data enables generation of a character for the game play of a corresponding user, wherein the character has a state that corresponds to the point in the gaming application experienced currently by a corresponding user. For example, user saved data may include the game difficulty selected by a corresponding user 100A when playing the game, game level, character attributes, character location, number of lives left, the total possible number of lives available, armor, trophy, time counter values, etc. User saved data may also include user profile data that identifies a corresponding user 100A, for example. User saved data may be stored in storage (not shown).

In that manner, the multi-player processing engine 219 using the state sharing data 217 and multi-player logic 218 is able to overlay/insert objects and characters into each of the gaming environments of the users participating in the multi-player gaming session. For example, a character of a first user is overlaid/inserted into the gaming environment of a second user. This allows for interaction between users in the multi-player gaming session via each of their respective gaming environments (e.g., as displayed on a screen).

Figure 2B:
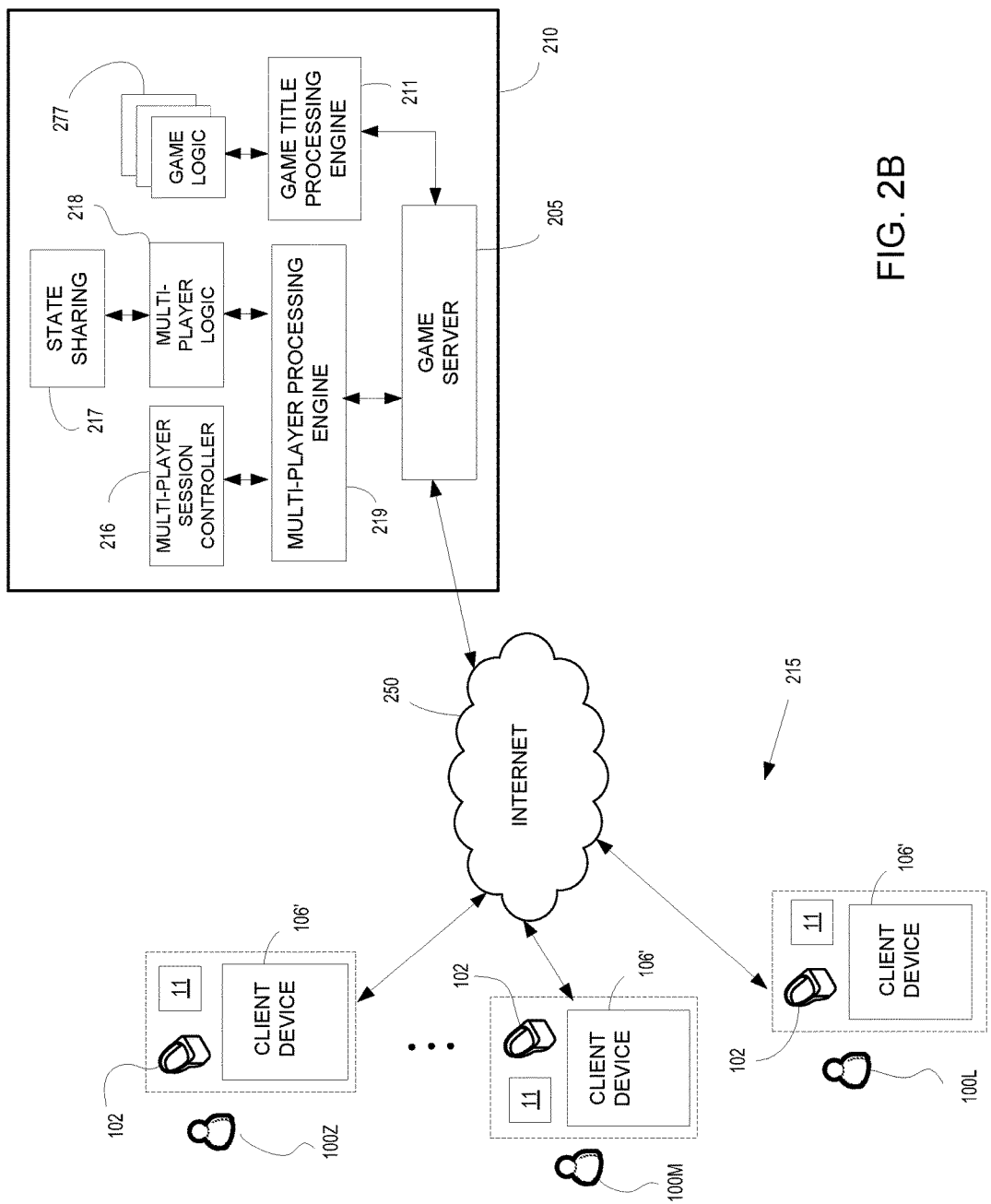
FIG. 2B illustrates a system providing gaming control to one or more users playing a gaming application as executed over a cloud game network, in accordance with one embodiment of the present disclosure.

FIG. 2B illustrates a system 200B providing gaming control to one or more users 215 (e.g., users 100L, 100M . . . 100Z) playing a gaming application in respective VR viewing environments as executed over a cloud game network, in accordance with one embodiment of the present disclosure. In some embodiments, the cloud game network may be a game cloud system 210 that includes a plurality of virtual machines (VMs) running on a hypervisor of a host machine, with one or more virtual machines configured to execute a game processor module utilizing the hardware resources available to the hypervisor of the host. Referring now to the drawings, like referenced numerals designate identical or corresponding parts.

As shown, the game cloud system 210 includes a game server 205 that provides access to a plurality of interactive video games or gaming applications. Game server 205 may be any type of server computing device available in the cloud, and may be configured as one or more virtual machines executing on one or more hosts. For example, game server 205 may manage a virtual machine supporting a game processor that instantiates an instance of a gaming application for a user. As such, a plurality of game processors of game server 205 associated with a plurality of virtual machines is configured to execute multiple instances of the gaming application associated with game plays of the plurality of users 215. In that manner, back-end server support provides streaming of media (e.g., video, audio, etc.) of game plays of a plurality of gaming applications to a plurality of corresponding users.

A plurality of users 215 accesses the game cloud system 210 via network 250, wherein users (e.g., users 100L, 100M . . . 100Z) access network 250 via corresponding client devices 106', wherein client device 106' may be configured similarly as client device 106 of FIG. 2A (e.g., including game executing engine 211, etc.), or may be configured as a thin client providing that interfaces with a back end server providing computational functionality (e.g., including game executing engine 211).

In particular, a client device 106' of a corresponding user 100L is configured for requesting access to gaming applications over a network 250, such as the internet, and for rendering instances of gaming application (e.g., video game) executed by the game server 205 and delivered to a display device associated with the corresponding user 100L. For example, user 100L may be interacting through client device 106' with an instance of a gaming application executing on game processor of game server 205. More particularly, an instance of the gaming application is executed by the game title execution engine 211. Game logic (e.g., executable code) implementing the gaming application is stored and accessible through a data store (not shown), and is used to execute the gaming application. Game title processing engine 211 is able to support a plurality of gaming applications using a plurality of game logics 277, as shown.

As previously described, client device 106' may receive input from various types of input devices, such as game controllers, tablet computers, keyboards, gestures captured by video cameras, mice touch pads, etc. Client device 106' can be any type of computing device having at least a memory and a processor module that is capable of connecting to the game server 205 over network 250. Also, client device 106' of a corresponding user is configured for generating rendered images executed by the game title execution engine 211 executing locally or remotely, and for displaying the rendered images on a display. For example, the rendered images may be associated with an instance of the first gaming application executing on client device 106' of user 100L. For example, a corresponding client device 106' is configured to interact with an instance of a corresponding gaming application as executed locally or remotely to implement a game play of a corresponding user, such as through input commands that are used to drive game play.

Client device 106' is configured for receiving rendered images, and for displaying the rendered images on display 11 and/or HMD 102 (e.g., displaying VR content). For example, through cloud based services the rendered images may be delivered by an instance of a gaming application executing on game executing engine 211 of game server 205 in association with user 100. In another example, through local game processing, the rendered images may be delivered by the local game executing engine 211. In either case, client device 106 is configured to interact with the local or remote executing engine 211 in association with the game play of a corresponding user 100, such as through input commands that are used to drive game play. In another implementation, the rendered images may be streamed to a smartphone or tablet, wirelessly or wired, direct from the cloud based services or via the client device 106 (e.g., PlayStation® Remote Play).

In another embodiment, multi-player processing engine 219, previously described, provides for controlling a multi-player gaming session for a gaming application. In particular, when the multi-player processing engine 219 is managing the multi-player gaming session, the multi-player session controller 216 is configured to establish and maintain communication sessions with each of the users and/or players in the multi-player session. In that manner, users in the session can communicate with each other as controlled by the multi-player session controller 216.

Further, multi-player processing engine 219 communicates with multi-player logic 218 in order to enable interaction between users within corresponding gaming environments of each user. In particular, state sharing module 217 is configured to manage states for each of the users in the multi-player gaming session. For example, state data may include game state data that defines the state of the game play (of a gaming application) for a corresponding user 100 at a particular point, as previously described. Further, state data may include user saved data that includes information that personalizes the video game for the corresponding player, as previously described. For example, state data includes information associated with the user's character, so that the video game is rendered with a character that may be unique to that user (e.g., shape, look, clothing, weaponry, etc.). In that manner, the multi-player processing engine 219 using the state sharing data 217 and multi-player logic 218 is able to overlay/insert objects and characters into each of the gaming environments of the users participating in the multi-player gaming session. This allows for interaction between users in the multi-player gaming session via each of their respective gaming environments (e.g., as displayed on a screen).

Figure 3A:
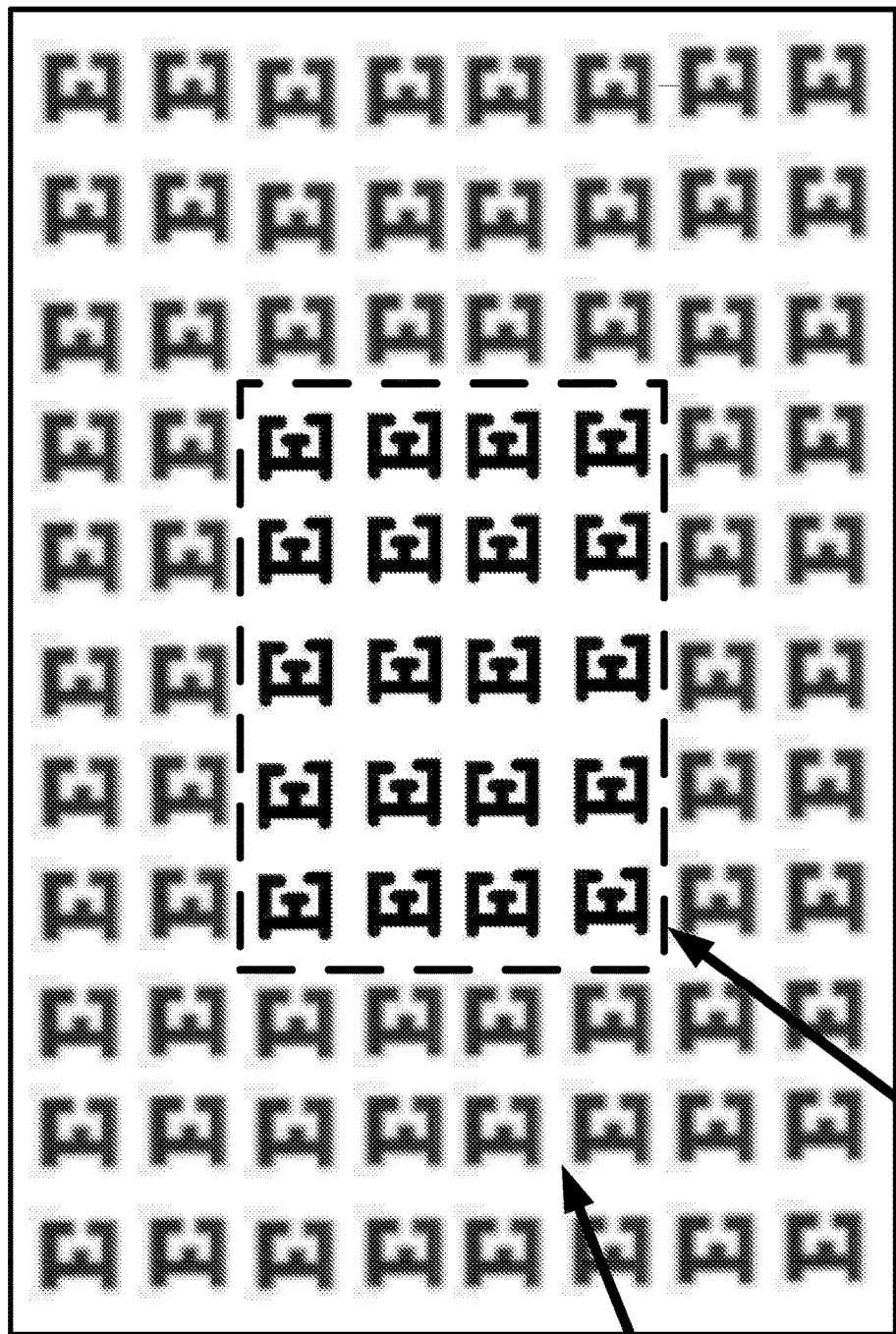
FIG. 3A illustrates an image shown on a display and including a foveal region of high resolution, wherein the foveal region corresponds to a center of the display, in accordance with one embodiment of the present disclosure.

FIG. 3A illustrates an image 310 shown on a display 300, wherein the image includes a foveal region 310A of high resolution, wherein the foveal region corresponds to a center of the display, in accordance with one embodiment of the present disclosure. In particular, image 310 includes rows and columns of the letter "E" for simplicity and clarity. The image 310 is partitioned into multiple regions, including a foveal region 310A and a peripheral region 310B.

As shown, the foveal region 310A is static and corresponds to the center of the display 300. The foveal region 310A is assumed to be the region towards which the user mostly directs his or her gaze (e.g., using the fovea of the eye), such as when viewing graphics of a video game. Though the gaze of the user may occasionally be directed off center, the gaze is mostly directed to the center (to view the main content). In some cases, the image is designed to initially bring the gaze of the user off-center (e.g., to view an object of interest), but then to bring the gaze back to the center (e.g., by moving the object towards the foveal region 310A).

In particular, the portion or portions of any image, such as image 310, as displayed and located within the foveal region 310A will be rendered at higher resolution. For example, the graphics pipeline will render portions of the image in the foveal region 310A while minimizing the use of any techniques used to reduce computational complexity. In particular, for embodiments of the present invention, light sources affecting objects displayed using pixels corresponding to the foveal region 310A are individually computed within the graphics pipeline in order to determine each of their effects on the objects (e.g., color, texture, shadowing, etc. on polygons of the objects). Representative of the higher resolution, the letter "E" objects as displayed within the foveal region 310A are shown with clarity, vibrant color, and minimal blurriness. This is consistent with and takes advantage of the gaze of the user being directed towards the foveal region 310A on display 300.

In addition, the portion or portions of an image, such as image 310, as disposed and located in the peripheral region 310B will be rendered at lower resolution (e.g., lower than the resolution of the portions of the image and/or objects located in the foveal region 310A). The gaze of the user is not typically directed to the objects located in and/or displayed in the peripheral region 310B, as the main focus of the gaze is directed to the objects in the foveal region 310A. Consistent with real-life views into a scene, the objects in the peripheral region 310B are rendered with lower resolution, with enough detail so that the user is able to perceive moving objects (e.g., a human walking straight-legged instead of with knees bent) and with sufficient contrast within an object or between objects in the peripheral region 310B, for example. To achieve rendering at lower resolutions, the graphics pipeline may render portions of the image in the peripheral region 310B using computationally efficient techniques that reduce computational complexity. In particular, for embodiments of the present invention, particle systems are simulated and/or rendered differently depending on whether the effect generated by the particle system is displayed inside or outside a foveal region of an image as displayed. For example, a particle system that is inside the foveal region is simulated and/or rendered using a full complement of particles in the particle system. A particle system that is outside the foveal region (i.e., in the peripheral region) is simulated and/or rendered using a subsystem of particles. As such, instead of computing all the particles in a particle system located in a peripheral region, only a subsystem of particles are simulated and/or rendered, thereby lessening the computation required for rendering the effect produced by the particle system in a corresponding image. This reduces computational processing when rendering the overall image (e.g., through simulation and/or rendering of the particle system), and especially for particle systems rendered in the peripheral region 310B. Also, each image containing a particle system rendered using a subsystem of particles and displayed outside the foveal region require less defining data than images containing a particle system that is simulated and/or rendered using the full complement of particles of the particle system. As such, the sequence of video frames can be delivered (e.g., over wired or wireless connections) in real time with minimal or no latency because less data is being transmitted.

Figure 3B:
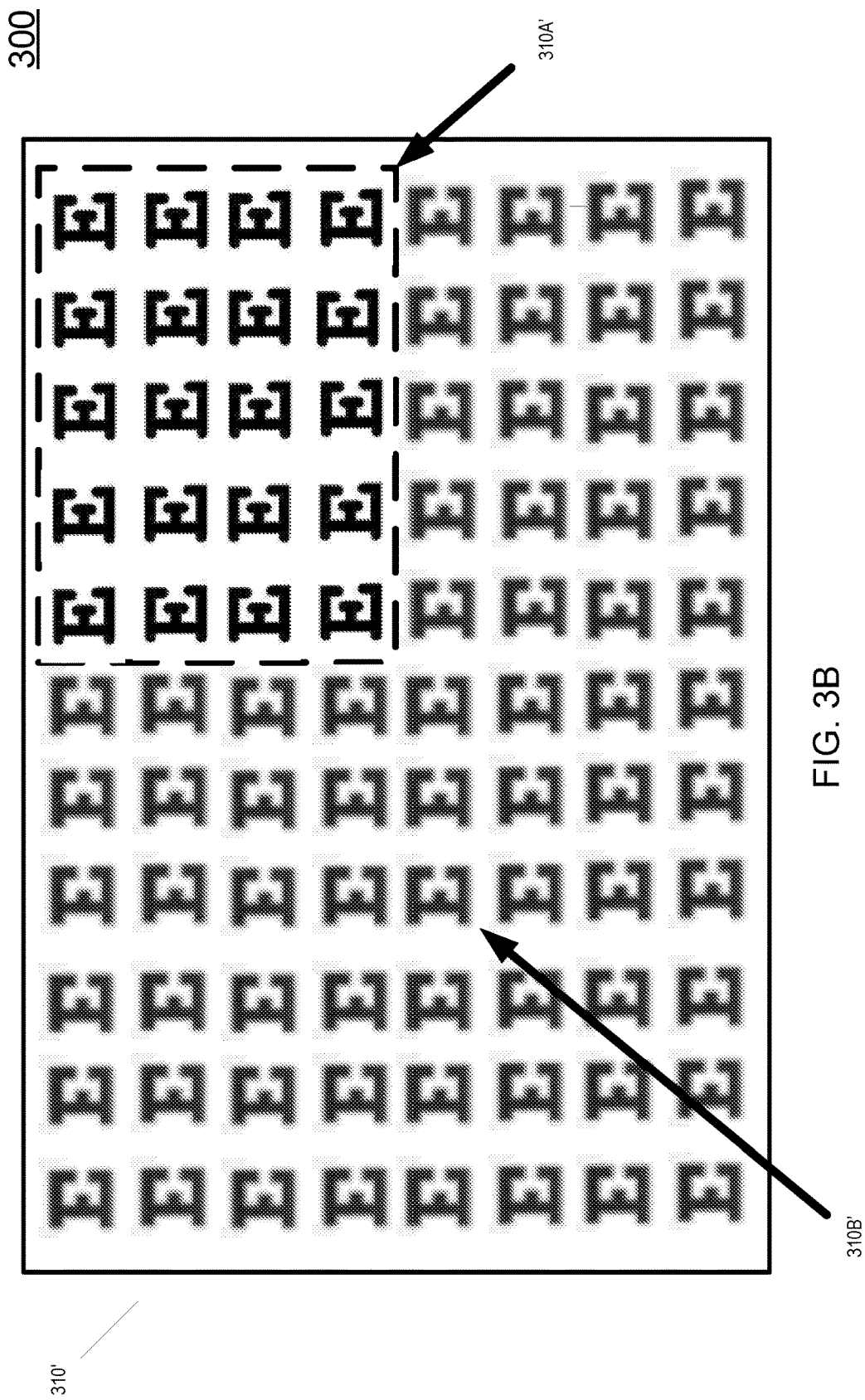
FIG. 3B illustrates an image shown on a display and including a foveal region of high resolution, wherein the foveal region corresponds to a location of the display towards which the user is directing his or her gaze, in accordance with one embodiment of the present disclosure.

FIG. 3B illustrates an image 310' shown on a display 300 and including a foveal region 310A' of high resolution, wherein the foveal region corresponds to a location of the display towards which the user is directing his or her gaze, in accordance with one embodiment of the present disclosure. In particular, image 310' is similar to image 310 shown in FIG. 3A and includes rows and columns of the letter "E" for simplicity and clarity. The image 310 is partitioned into multiple regions, including a foveal region 310A' and a peripheral region 310B'.

As shown, the foveal region 310A' is dynamically moving throughout display 300 depending on which direction the gaze of the user is directed towards. As previously described, the gaze may be tracked using gaze tracking camera 165 of HMD 102, for example. As such, the foveal region 310A' may not necessarily correspond to the center of display 300, but instead correlates to the actual direction and focus of attention of the user within image 310'. That is, the foveal region 310A' dynamically moves with the movement of the eye and/or eyes of the user.

As previously introduced, the portion or portions of any image, such as image 310', as displayed and located within the foveal region 310A' will be rendered at higher resolution by minimizing the use of any rendering techniques used to reduce computational complexity when rendering objects located in the foveal region 310A'. In particular, for embodiments of the present invention, light sources affecting objects displayed using pixels corresponding to the foveal region 310A' are individually computed within the graphics pipeline in order to determine each of their effects on the objects (e.g., color, texture, shadowing, etc. on polygons of the objects). Representative of the higher resolution, the letter "E" objects as displayed within the foveal region 310A' are shown with clarity, vibrant color, and minimal blurriness.

In addition, the portion or portions of an image, such as image 310', as disposed and located in the peripheral region 310B' will be rendered at lower resolution (e.g., lower than the resolution of the portions of the image and/or objects located in the foveal region 310A). As previously introduced, the gaze of the user is not typically directed to the objects located in and/or displayed in the peripheral region 310B', as the main focus of the gaze is directed to the objects in the foveal region 310A'. As such, the objects in the peripheral region 310B' are rendered with lower resolution, with enough detail so that the user is able to perceive moving objects (e.g., a human walking straight-legged instead of with knees bent) and with sufficient contrast within an object or between objects in the peripheral region 310B', for example. To achieve rendering at lower resolutions, the graphics pipeline may render portions of the image in the peripheral region 310B' using computationally efficient techniques that reduce computational complexity. In particular, as previous described for embodiments of the present invention, the simulation and/or rendering of a particle system is performed using a subsystem of particles when the effect of the particle system is displayed in a peripheral region of an image.

Figure 4A:
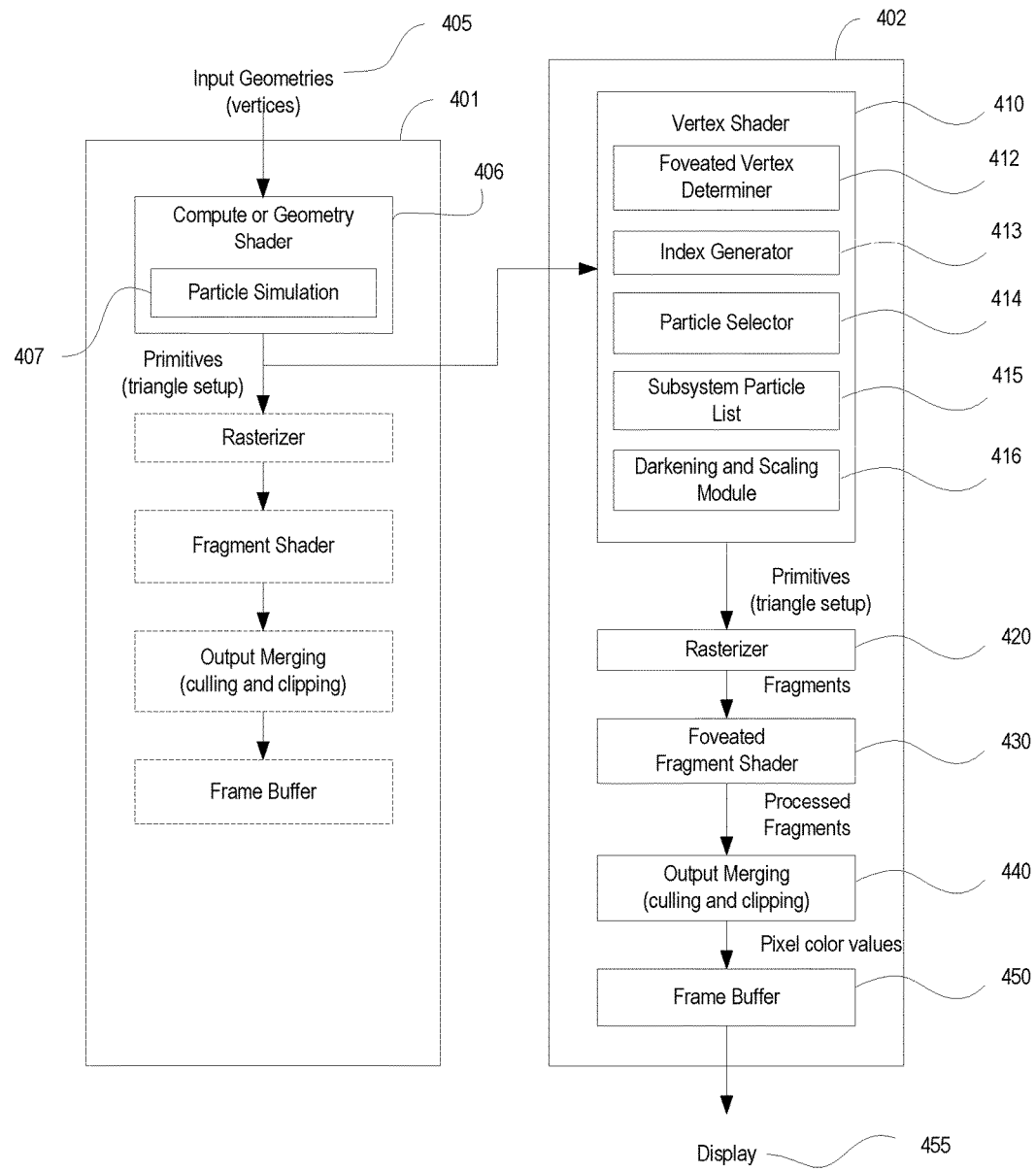
FIG. 4A illustrates a graphics processor implementing a graphics pipeline configured for foveated rendering including particle system simulation of a limited amount of particles (e.g., less than ten thousand) using a central processing unit (CPU) or graphics processing unit (GPU) and the rendering of the particle system in the GPU using the full system of particles or a subsystem of particles generated through random sampling depending on whether the drawn effect of the particle system is located within a foveal region or peripheral region, in accordance with one embodiment of the present disclosure.

FIG. 4A illustrates a system 400A implementing a graphics pipeline configured for foveated rendering including particle system simulation of a limited amount of particles (e.g., less than ten thousand) using a central processing unit (CPU) or graphics processing unit (GPU) and the rendering of the particle system in the GPU using the full system of particles or a subsystem of particles generated through sampling (e.g., random, nearest neighbor, similarity, etc.) depending on whether the drawn effect of the particle system is located within a foveal region or peripheral region, in accordance with one embodiment of the present disclosure. The graphics pipeline 400A is illustrative of the general process for rendering images using 3D (three dimensional) polygon rendering processes, but is modified to perform additional programmable elements within the pipeline to perform foveated rendering, such as simulating and/or rendering particle systems using a full complement of particles or a subsystem of particles depending on the location of the effect generated by the particle system with respect to a foveal region of a corresponding image. The graphics pipeline 400A for a rendered image outputs corresponding color information for each of the pixels in a display, wherein the color information may represent texture and shading (e.g., color, shadowing, etc.). Graphics pipeline 400A is implementable within the game console 106 of FIG. 1A, VR content engine 120 of FIG. 1B, client devices 106 of FIGS. 2A and 2B, and/or game title processing engine 211 of FIG. 2B.

Particle simulation may take place on the CPU or GPU. Most simple or small particle systems will execute on the CPU. On the other hand, simulations with large numbers of particles may take place on the GPU, which in that case, simulations performed on the GPU will include computations that will likely take place in a compute or geometry shader before the rendering is performed. System 400A is configured to perform particle simulation on particle systems having a limited amount of particles (e.g., a small particle system having less than ten thousand particles). System 400 includes a programmable processor 401 and a programmable processor 402 configured for foveated rendering including processing vertex data, assemble vertices into primitives (e.g., polygons), perform rasterization to generate fragments from the primitives relative to the display, and then compute color and depth values for each fragment, as well as blend the fragments on a pixel by pixel basis for storing to a framebuffer for displaying. The operations performed by the processor 401 may be performed either in the CPU or GPU. The operations performed by programmable shader 402 are generally more suited for execution in the GPU for better performance and efficiency.

As shown, the graphics pipeline of system 400A receives input geometries 405. For example, the input geometries 405 may include vertices within a 3D gaming world, and information corresponding to each of the vertices. A given object within the gaming world can be represented using polygons (e.g., triangles) defined by vertices, wherein the surface of a corresponding polygon is then processed through the graphics pipeline 400A to achieve a final effect (e.g., color, texture, etc.). Vertex attributes may include normal (e.g., which direction is the light in relation to the vertex), color (e.g., RGB—red, green, and blue triple, etc.), and texture coordinate/mapping information. For ease of illustration, the input geometries for the 3D gaming world are shown to be inputted to processor 401, though the geometries may also be partitioned such that geometries for the particle system are input to processor 401, and remaining geometries input to vertex shader 410 of the processor 402. For example, the input geometries may be input into a vertex buffer that can be shared between the processors 401 and 402.

In particular, programmable processor 401 performs particle simulation (e.g., calculate particle motion, etc.) from frame-to-frame depending on the position, mass, and velocity of the particles, and the various forces applied to the particles (e.g., external forces, such as gravity, etc., and internal forces describing particle to particle interaction). Generally, from the first frame to succeeding frames, the processor 401 performs operations to initialize particle positions, and update the particle positions. In particular, for each frame rendered, the simulation of the each particle is updated (e.g., position, orientation, velocity, etc.) in discrete time steps (e.g., frame-by-frame). As shown in FIG. 4A, processor 401 may be implemented within a GPU configuration and programmed to perform particle system simulation. In particular, particle simulation may be performed by a compute or geometry shader of the GPU. For example, the compute or geometry shader 406 may include a particle simulation module 407 that performs particle simulation. An output of the shader 406 may include primitives (e.g., polygons) of the particle system. As implemented within a GPU configuration, the remaining components (e.g., rasterizer, fragment shader, and renderer—including the output merger and frame buffer) are idle, such that the output from the shader 406 is then delivered and/or shared with the processor 402 to perform the more traditional GPU operations including rendering. Of course, in a CPU implementation, processor 401 could be simplified to only include shader 406 and particle simulation module 407.

The particles are drawn using the processor 402 as implemented within a GPU configuration. In particular, the simulation results are stored to a vertex buffer, which is then input to the processor 402 (e.g., the vertex shader). The values in the vertex buffer can be shared between stages of the graphics pipeline of system 400A shown in FIG. 4A. More particularly, the vertex shader 410 receives the input geometries 405 directly and from processor 401, as previously described, and builds the polygons or primitives that make up the objects within the 3D scene. Vertex shader 410 may further build the primitives for the simulated particle system if not completed by the processor 401. That is, the vertex shader 410 builds up the objects using the primitives as they are placed within the gaming world. For example, the vertex shader 410 may be configured to perform lighting and shadowing calculations for the polygons, which is dependent on the lighting for the scene. The primitives are output by the vertex processor 410 and delivered to the next stage of the graphics pipeline 400A. Additional operations may also be performed by the vertex processor 410 such as clipping (e.g., identify and disregard primitives that are outside the viewing frustum as defined by the viewing location in the gaming world).

In embodiments of the present invention, the processor 402 is configured to perform foveated rendering, including rendering a particle system in an efficient manner, including rendering a subsystem of particles when the effect generated by the particle system is displayed outside a foveal region. In particular, the foveated vertex determiner 412 of the vertex shader 410 may be configured to determine if a particle or the vertices of the particle lies inside or outside the foveal region.

When the particle or its components lies within the peripheral region, the vertex shader 410 is configured to determine whether to discard the vertex or allow it to go forward through the graphics pipeline (such as through the rasterizer/fragment shader). Various techniques may be implemented to determine which particles to discard from the system of particles. In general, vertex shader 410 may select particles within the particle system for rendering. For example, the selection may be performed through various techniques, including random selection, nearest neighbor, similarity, etc. In one embodiment, an index list 415 is used to determine whether the particle or components of the particle are to be rendered or discarded. Drawing objects with indices are well known in the art and is used to reduce computation complexity (e.g., reduce duplication of the same vertex in an object). Briefly for illustration, index generator 413 is configured to create an index (e.g., using an index buffer), wherein particles and their components (e.g., primitives, vertices, etc.) are associated with one or more indices in the index. For example, the index buffer includes an array of indices, wherein the indices match the location of the vertices in a vertex buffer. As such, instead of duplicating the same vertex for each its associated polygons, a single index can be used that maps to one location in the vertex buffer. Further, the particle selector 414 is configured to select particles, such as by generating a list 415 of selected indices through various selection techniques (e.g., random selection, nearest neighbor, similarity, etc. The selected indices and/or components of the particles would be the selected samples forming a reduced set (e.g., the subsystem of particles), as stored in the list. As such, when a vertex falls outside the fovea, that vertex may be checked to see if its associated index is contained in the "draw list" (e.g., included within list 415). If the vertex is not associated with an index that was selected (e.g., as stored in list 415), then that vertex is discarded, and not rendered through the remaining shaders in the pipeline. On the other hand, if the vertex is associated within an index in the list 415 (e.g., selected to be included in the list), then that vertex is forwarded through the pipeline for rendering. Thereafter, whether it is the full complement of particles or subsystem of particles that is output by the vertex shader 410 in association with the particle system, the remaining operations operate in the typical fashion.

Visual properties of the particles are modified to maintain a desired perceptual continuity. For example, darkening and scaling module 416 is configured to modify the attributes of the components of the particle system. In particular, darkening and scaling are performed in the vertex shader so that the input into the fragment shader is adjusted for non-foveated rendering of the particle system (e.g., rendering the subsystem of particles). In that manner, no further adjustments to the output of the foveated fragment shader 430 are necessary for proper rendering to the particle system in the peripheral region. Other visual properties may be similarly modified to maintain the desired perceptual continuity, such as color, alpha values, material, etc.

In particular, for the scaling attribute, the output from the vertex shader 410 may be modified to be larger in size. For example, if point sprites are used, then the output point size may be scaled larger by a factor. The factor may be determined in any number of ways. For example, the factor may be a reduction ratio related to the number of particles in the subsystem compared to the total number of particles. In another implementation, if the particle system is described using instanced geometry (e.g., rendering multiple copies of a single mesh with parameter variations of those copies to create an object built using repeated geometries, primitives, etc.), then the instanced mesh would be scaled larger by a factor. The scaling is performed to produce a similarly sized effect when processing the subsystem of particles as when rendering the full complement of particles of the particle system.

Darkening of the particles or components of the particles is performed to produce a similarly colored effect (i.e., to maintain the desired perceptual continuity) when processing the subsystem of particles as when rendering the full complement of particles of the particle system. In one implementation, the alpha values of the components of the particles are adjusted to darken each particle of the subsystem of particles. For example, the alpha value would be adjusted to increase to opacity of the effect (e.g., smoke) when making the particle larger (e.g., scaling). Still other visual properties (e.g., material, etc.) may be similarly modified to maintain the desired perceptual continuity.

The primitives output by the vertex processor 410 are fed into the rasterizer 420 that is configured to project objects in the scene to a two-dimensional (2D) image plane defined by the viewing location in the 3D gaming world (e.g., camera location, user eye location, etc.). These primitives include the subsystem of particles (e.g., instead of the full complement of particles) when the effect generated by the particle system is in the peripheral region. In one embodiment, the subsystem of particles is rendered when at least a portion of the effect is in the peripheral region. In another embodiment, the subsystem of particles is rendered when the entire effect is in the peripheral region to render the particle system at a lower resolution. Also, the primitives may include the full system of particles when the effect generated by the particle system is in the foveal region to render the particle system at a higher resolution.

At a simplistic level, the rasterizer 420 looks at each primitive and determines which pixels are affected by the corresponding primitive. In particular, the rasterizer 420 partitions the primitives into pixel sized fragments, wherein each fragment corresponds to a pixel in the display and/or a reference plane associated with the rendering point-of-view (e.g., camera view). It is important to note that one or more fragments may contribute to the color of a corresponding pixel when displaying an image. Additional operations may also be performed by the rasterizer 420 such as clipping (identify and disregard fragments that are outside the viewing frustum) and culling (disregard fragments that are occluded by closer objects) to the viewing location.

The foveated fragment processor 430 at its core performs shading operations on the fragments to determine how the color and brightness of a primitive varies with available lighting. For example, fragment processor 430 may determine depth, color, normal and texture coordinates (e.g., texture details) for each fragment, and may further determine appropriate levels of light, darkness, and color for the fragments. In particular, fragment processor 430 calculates the traits of each fragment, including color and other attributes (e.g., z-depth for distance from the viewing location, and alpha values for transparency). In addition, the fragment processor 430 applies lighting effects to the fragments based on the available lighting affecting the corresponding fragments. Further, the fragment processor 430 may apply shadowing effects for each fragment.

More particularly, the foveated fragment shader 430 performs shading operations as described above based on whether the fragment is within the foveal region or peripheral region. Fragments that are located within the foveal region of the displayed image are processed using shading operations at high resolution, without regard to processing efficiency in order to achieve detailed texture and color values for fragments within the foveal region. On the other hand, the foveated fragment processor 430 performs shading operations on fragments that are located within the peripheral region with an interest in processing efficiency in order to process fragments with sufficient detail with minimal operations, such as providing movement and sufficient contrast.

For example, in embodiments of the present invention fragments of particle systems are rendered differently depending on whether the fragment is inside or outside the foveal region (e.g., contributes to a pixel inside or outside the foveal region). Because the vertex shader 410 has previously determined whether particles and/or their component geometries are located inside or outside the foveal region and filtered those component geometries accordingly (e.g., computing indexed vertices to render a subsystem of particles when the effect generated by the particle system is in the peripheral region), the output of the vertex shader 410 is already positioned to provide the proper primitives to the remaining components of the graphics pipeline (e.g., including the rasterizer 420 and foveated fragment shader 430, etc.). As such, the remaining components of the graphics pipeline of programmable shader 402 are configured to render a full complement of particles in the particle system when the effect generated by the particle system is in the foveal region. Also, the remaining components of the graphics pipeline of programmable shader 402 are configured to render a subsystem of particles when the effect is in the peripheral region.

The output of the fragment processor 430 includes processed fragments (e.g., texture and shading information) and is delivered to the next stage of the graphics pipeline 400A.

The output merging component 440 calculates the traits of each pixel depending on the fragments that contribute and/or affect each corresponding pixel. That is, the fragments of all primitives in the 3D gaming world are combined into the 2D color pixel for the display. For example, fragments that contribute to texture and shading information for a corresponding pixel are combined to output a final color value for the pixel delivered to the next stage in the graphics pipeline 400A. The output merging component 440 may perform optional blending of values between fragments and/or pixels determined from the fragment processor 430.

Color values for each pixel in the display 455 are stored in the frame buffer 450. These values are scanned to the corresponding pixels when displaying a corresponding image of the scene. In particular, the display reads color values from the frame buffer for each pixel, row-by-row, from left-to-right or right-to-left, top-to-bottom or bottom-to-top, or any other pattern, and illuminates pixels using those pixel values when displaying the image.

Figure 4B:
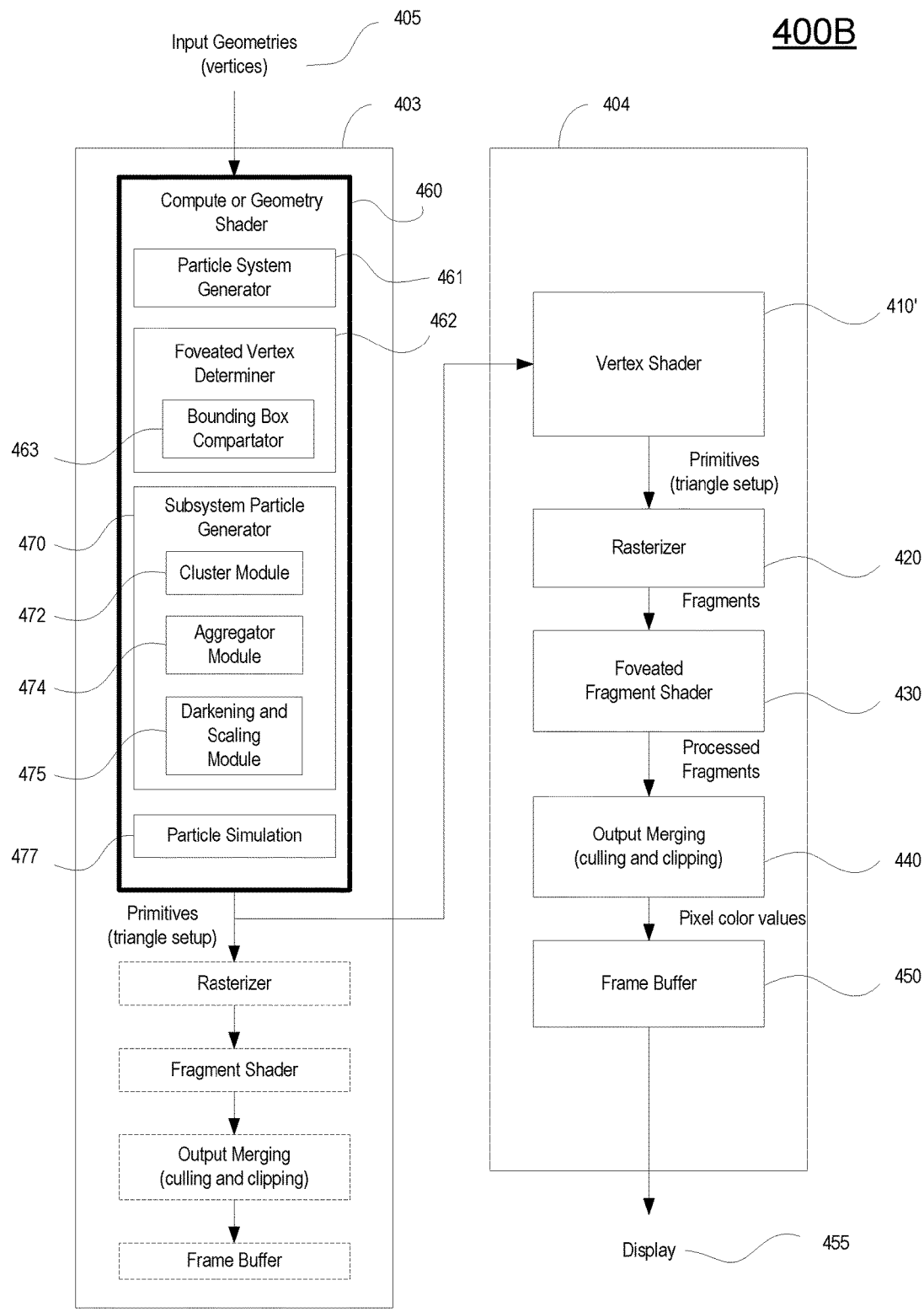
FIG. 4B illustrates a graphics processor implementing a graphics pipeline configured for foveated rendering including particle system simulation of a large amount of particles (e.g., more than ten thousand), wherein the particle system is both simulated and then rendered using the full system of particles or a subsystem of particles generated through particle clustering and aggregation depending on whether the drawn effect of the particle system is located within a foveal region or peripheral region, in accordance with one embodiment of the present disclosure.

FIG. 4B illustrates a graphics processor implementing a graphics pipeline configured for foveated rendering including particle system simulation of a large amount of particles (e.g., more than ten thousand), wherein the particle system is both simulated and then rendered using the full system of particles or a subsystem of particles generated through particle clustering and aggregation depending on whether the drawn effect of the particle system is located within a foveal region or peripheral region, in accordance with one embodiment of the present disclosure. The graphics pipeline 400B is illustrative of the general process for rendering images using 3D (three dimensional) polygon rendering processes, but is modified to perform additional programmable elements within the pipeline to perform foveated rendering, such as simulating and/or rendering particle systems using a full complement of particles or a subsystem of particles depending on the location of the effect generated by the particle system with respect to a foveal region of a corresponding image. The graphics pipeline 400B for a rendered image outputs corresponding color information for each of the pixels in a display, wherein the color information may represent texture and shading (e.g., color, shadowing, etc.). Graphics pipeline 400B is implementable within the game console 106 of FIG. 1A, VR content engine 120 of FIG. 1B, client devices 106 of FIGS. 2A and 2B, and/or game title processing engine 211 of FIG. 2B. The graphics pipeline 400B may contain similar components as the pipeline 400A of FIG. 4A, wherein like referenced numerals designate identical or corresponding parts.

Though particle simulation may be performed on the CPU or GPU, as shown in FIG. 4B, the particle simulation is performed on the GPU because the large amount of parallel processing due to the greater number of particles in the particle system, in one embodiment. Pipeline 400B is configured to perform particle simulation on particle systems having a large amount of particles (e.g., greater than ten thousand), and includes a programmable processor 403 and a programmable processor 404 configured for traditional rendering processes, such as processing vertex data, assemble vertices into primitives (e.g., polygons), perform rasterization to generate fragments from the primitives relative to the display, and then compute color and depth values for each fragment, as well as blend the fragments on a pixel by pixel basis for storing to a framebuffer for displaying.

As shown, the graphics pipeline 400B receives input geometries 405, as previously described, to include vertices within a 3D gaming world, and information corresponding to each of the vertices. Objects in the 3D world are represented using polygons (e.g., triangles) defined by vertices, wherein the surface of a corresponding polygon is then processed through the graphics pipeline 400B to achieve a final effect (e.g., color, texture, etc.). In one embodiment, the input geometries 405 include the system of particles. In other embodiments, the particle system is generated within the graphics pipeline 400B, such as using the particle system generator 461. Vertex attributes may include normal (e.g., which direction is the light in relation to the vertex), color (e.g., RGB—red, green, and blue triple, etc.), and texture coordinate/mapping information. The input geometries are input to the programmable processor 403, and more particularly the shader 460 (e.g., compute or geometry shader) that is configured for performing particle reduction and particle simulation. Generally, the input geometries may be placed into a vertex buffer that can be shared between the processors 403 and 404.

Because the simulation takes place before rendering, the particle count may be reduced for simulation. Reduction of the particle count and particle simulation may be performed by the compute or geometry shader 460. In one embodiment, reduction of the particle count (e.g., to generate the subsystem of particles) is performed when the entire particle system is outside the fovea (e.g., displayed in the peripheral region). Reduction is performed before simulation within the vertex shader 460. In particular, the foveated vertex determiner 462 is configured to determine if the particle system lies inside or outside the foveal region. This could be done by defining a bounding box for the particle system to see if the entire particle system is outside the fovea. For example, the bounding box comparator 463 is configured to determine if the particle system is located in the peripheral region.

When the particle system is outside the foveal region, the subsystem particle generator 470 is configured to reduce the particle count before simulation. In particular, the cluster module 472 is configured to group the particles into multiple clusters of particles. For each cluster of particles, aggregator module 474 aggregates all the particles in the cluster into one aggregated particle, such that the cluster of particles is now represented by a single aggregated particle. As such, a subsystem of particles is generated comprising the plurality of aggregated particles of the clusters. The number of particles in the cluster may be determined by dividing the total number of particles in the particle system by the target number.

Cluster module 472 may be configured to determine a target number of aggregated particles, which corresponds to a target number of clusters in the particle system. The target number corresponds to the total number of aggregated particles that will be processed when rendering the particle system. The particles selected from the particle system to be included in the subsystem of particles (e.g., the aggregated particles) may be determined from clustering the particle system (e.g., the target number of clusters). In one embodiment, clustering is performed based on the relative distance between the particles. For example, to accomplish this distance based aggregation (e.g., clustering), the clusters are generated using nearest neighbor search or a k-means clustering techniques to choose the optimal clustering of particles, wherein each cluster of particles is associated with a corresponding aggregated light source, and wherein each cluster of light sources incudes at least one light source. In one embodiment, a threshold is placed on the maximum distance of particles within a cluster. A cluster error may be determined for each cluster, wherein the error is based on the distance between particles in the cluster. The selected clusters are determined by having the least amount of cluster errors, or rather minimizing the plurality of cluster errors for the plurality of clusters.

Aggregator module 474 takes each cluster of particles and generates a corresponding aggregated particle. The aggregated particle has characteristics that are averages of the characteristics for the particles in the in the corresponding cluster. For example, the aggregated particle has characteristics that are averages of distance, color, etc. In particular, the aggregated particle may include a new location that is the average location of the particles in the cluster. The aggregated particle may have an aggregated mass, which is determined by summing the masses of the particles in the corresponding cluster. A new color for the aggregated light source may be an average or weighted sum of the colors for each particle in the cluster. Still other visual properties are aggregated, to include without limitation: color, alpha value, material, etc.

Darkening and scaling module 475 is configured to modify the attributes of the components of the particle system. Darkening and scaling are performed in the compute or geometry shader 460 so that no further adjustments to the particle system need be performed when performing non-foveated rendering (e.g., rendering the subsystem of particles). That is, all adjustments to the particle system are performed in the shader 460 for non-foveated processing of the particle system before the simulation stage.

In particular, for the scaling attribute, the darkening and scaling module 475 modifies the size (e.g., increase the size) of the aggregated particles in the subsystem of particles. For example, if point sprites are used, then the output point size may be scaled larger by a factor. The factor may be determined in any number of ways. For example, the factor may be a reduction ratio related to the number of particles in the subsystem compared to the total number of particles, as previously described. In another implementation, if the particle system is described using instanced geometry (e.g., rendering multiple copies of a single mesh with parameter variations of those copies), then the instanced mesh can be scaled larger by a factor. The scaling is performed to produce a similarly sized effect when processing the subsystem of particles as when rendering the full complement of particles of the particle system.

Darkening of the particles or components of the particles is performed to produce a similarly colored effect when processing the subsystem of particles as when rendering the full complement of particles of the particle system. In one implementation, the alpha values of the components of the aggregated particles are adjusted to darken each particle of the subsystem of particles. For example, the alpha value would be adjusted to increase to opacity of the effect (e.g., smoke) when making the particle larger (e.g., scaling). Still other visual properties (e.g., material, etc.) may be similarly modified to maintain the desired perceptual continuity.

The output of the darkening and scaling module 475 is already adjusted for non-foveated processing of the particle system. No further reduction to the particle system or adjustments to the particle system is necessary for rendering the particle system that is in the peripheral region.

The particle simulation module 477 performs particle simulation (e.g., calculate particle motion, etc.) from frame-to-frame depending on the position, mass, and velocity of the particles, and the various forces applied to the particles (e.g., external forces, such as gravity, electrostatic, etc., and internal forces describing particle to particle interaction). Generally, from the first frame to succeeding frames, operations are performed to initialize particle positions, and update the particle positions.

The output of the compute or geometry shader 460 is adjusted for non-foveated processing of the particle system. No further reduction to the particle system or adjustments to the particle system is necessary for rendering the particle system that is in the peripheral region. The output of the shader 460 may include primitives (e.g., polygons) of the particle system. For example, the output may be stored in a vertex buffer, which is then input to the programmable processor 404 (e.g., vertex shader 410'). That is, the values in the vertex buffer may be shared between stages of the graphics pipeline 400B as shown in FIG. 4B. As implemented within a GPU configuration, the remaining components (e.g., rasterizer, fragment shader, and renderer—including the output merger and frame buffer) are idle, such that the output from the shader 460 is then delivered and/or shared with the processor 404 to perform the more traditional GPU operations including rendering.

More particularly, the vertex shader 410' receives the input geometries 405 directly and/or from processor 403, as previously described, and builds the polygons or primitives that make up the objects within the 3D scene. Vertex shader 410' may further build the primitives for the simulated particle system if not completed by the processor 403. That is, the vertex shader 410' builds up the objects using the primitives as they are placed within the gaming world. For example, the vertex shader 410' may be configured to perform lighting and shadowing calculations for the polygons, which is dependent on the lighting for the scene. The primitives are output by the vertex processor 410' and delivered to the next stage of the graphics pipeline 400B. Additional operations may also be performed by the vertex processor 410' such as clipping (e.g., identify and disregard primitives that are outside the viewing frustum as defined by the viewing location in the gaming world).

The primitives output by the vertex processor 410' are fed into the rasterizer 420 that is configured to project objects in the scene to a two-dimensional (2D) image plane defined by the viewing location in the 3D gaming world (e.g., camera location, user eye location, etc.). These primitives include the subsystem of particles (e.g., instead of the full complement of particles) when the effect generated by the particle system is in the peripheral region, as previously performed by the compute shader 403. Also, the primitives may include the full system of particles when the effect generated by the particle system is in the foveal region to render the particle system at a higher resolution.

As previously described, rasterizer 420 looks at each primitive and determines which pixels are affected by the corresponding primitive. In particular, the rasterizer 420 partitions the primitives into pixel sized fragments, wherein each fragment corresponds to a pixel in the display and/or a reference plane associated with the rendering point-of-view (e.g., camera view). One or more fragments may contribute to the color of a corresponding pixel when displaying an image.

The foveated fragment shader 430 at its core performs shading operations on the fragments to determine how the color and brightness of a primitive varies with available lighting. For example, fragment shader 430 may determine depth, color, normal and texture coordinates (e.g., texture details) for each fragment, and may further determine appropriate levels of light, darkness, and color for the fragments. In particular, fragment shader 430 calculates the traits of each fragment, including color and other attributes (e.g., z-depth for distance from the viewing location, and alpha values for transparency). In addition, the fragment shader 430 applies lighting effects to the fragments based on the available lighting affecting the corresponding fragments. Further, the fragment shader 430 may apply shadowing effects for each fragment. The output of the fragment processor 430 includes processed fragments (e.g., texture and shading information) and is delivered to the next stage of the graphics pipeline 400. Because the vertex shader 460 has previously determined when the particle system should be reduced, the input to the foveated fragment shader 430 is already properly clustered and aggregated when the when the particle system is in the peripheral region. That is, the fragments of a particle system are rendered differently depending on whether the fragment is inside or outside the foveal region. As such, remaining components of the graphics pipeline of programmable shader 404 are configured to render a full complement of particles in the particle system when the effect generated by the particle system is in the foveal region. Also, the remaining components of the graphics pipeline of programmable shader 404 are configured to render a subsystem of particles when the effect is in the peripheral region.

The output merging component 440 calculates the traits of each pixel depending on the fragments that contribute and/or affect each corresponding pixel. That is, the fragments of all primitives in the 3D gaming world are combined into the 2D color pixel for the display. For example, fragments that contribute to texture and shading information for a corresponding pixel are combined to output a final color value for the pixel delivered to the next stage in the graphics pipeline 400B. The output merging component 440 may perform optional blending of values between fragments and/or pixels determined from the fragment processor 430.

Color values for each pixel in the display 455 are stored in the frame buffer 450. These values are scanned to the corresponding pixels when displaying a corresponding image of the scene. In particular, the display reads color values from the frame buffer for each pixel, row-by-row, from left-to-right or right-to-left, top-to-bottom or bottom-to-top, or any other pattern, and illuminates pixels using those pixel values when displaying the image.

In addition, for the systems and graphic pipelines of FIGS. 4A and 4B, additional methods may be implemented for non-foveated rendering. In one embodiment, particle systems that are located in the peripheral region may be updated less often than if the system was located in the foveal region. For example, a cloth animation simulated through a particle system simulation may be executed at a lower frame-per-second. In another embodiment, the particle system that is represented through meshes may be generated and/or rendered using less denser meshes when located in the peripheral region. For example, water may be represented using less denser meshes when located outside of the foveal region.

Figure 5:
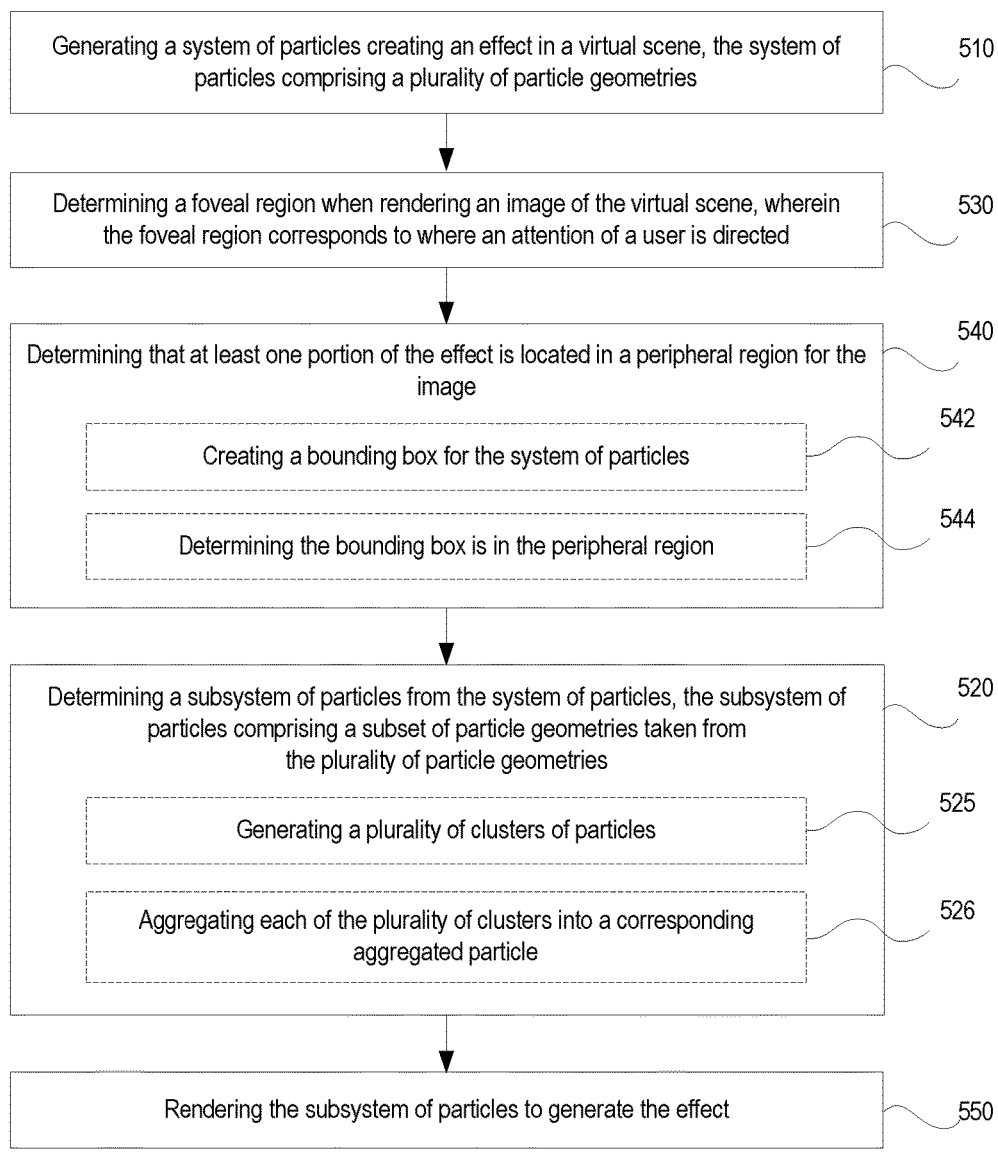
FIG. 5 is a flow diagram illustrating steps in a method for implementing a graphics pipeline including the simulation of a large amount of particles (e.g., more than ten thousand), wherein the particle system is both simulated and then rendered using the full system of particles or a subsystem of particles generated through particle clustering and aggregation depending on whether the drawn effect of the particle system is located within a foveal region or peripheral region, in accordance with one embodiment of the present disclosure.

With the detailed description of the various modules of the gaming server and client device communicating over a network, flow diagram 500 of FIG. 5 discloses a method for implementing a graphics pipeline configured to perform foveated rendering including the simulation of a large amount of particles (e.g., more than ten thousand), wherein the particle system is both simulated and then rendered using the full system of particles or a subsystem of particles generated through particle clustering and aggregation depending on whether the drawn effect of the particle system is located within a foveal region or peripheral region, in accordance with one embodiment of the present disclosure. Though the method of FIG. 5 is especially suited for particle simulation with large numbers of particles, the method is also suitable for particle simulation with smaller numbers of particles (e.g., less than ten thousand), in one embodiment. Flow diagram 500 is implemented within a client device or cloud based gaming system when rendering images, as previously described. In one implementation, the client device is a gaming console (also referred to as game console).

At 510, the method includes generating a system of particles, wherein the system of particles generates an effect in a virtual scene (e.g., an image of a 3D gaming world as displayed). The system of particles includes a plurality of particle geometries (e.g., vertices, polygons, triangles, etc.). In particular, a plurality of vertices for the particles is input to the graphics pipeline. A plurality of particle geometries (e.g., polygons) is generated from the geometries. Because the system of particles is limited, the simulation is performed using the full complement of particles. That is, the effect is simulated using the particle geometries.

However, when the effect is located in the peripheral region, the system of particles is reduced before simulation. In particular, at 530, the method includes determining a foveal region when rendering an image of the virtual scene, wherein the foveal region may correspond to where an attention of a user is directed (e.g., assumed or tracked). The foveal region may be associated with rendering surfaces at the highest resolution (rendering a particle system using the full complement of particles, and using a subsystem of particles when in the peripheral region). For example, foveated determiner 462 of FIG. 4B may be configured to perform the operations of 530.

At 540, the method includes determining that at least one portion of the effect is located in the peripheral region for the image. For example, at least one particle or particle geometry (e.g., polygon, fragment, etc.) may be determined to be in the peripheral region. In particular, at 542, the method includes defining a bounding box of the system of particles. At 544, the method includes determining that the system of particles is in the peripheral region when the bounding box is outside the foveal region—i.e., inside the peripheral region.

In that case, the method includes at 520 determining a subsystem of particles from the system of particles. The subsystem of particles includes a subset of particle geometries based on the plurality of particle geometries for the system of particles. For example, the subsystem particle generator 470 of FIG. 4B is configured to perform the reduction of particles. In particular, the reduction is performed by generating a plurality of clusters of particles at 525, as previously described in relation to FIG. 4B. In particular, each of the clusters is represented by a corresponding aggregated particle at 526, wherein the subsystem of particles includes and is made up using the aggregated particles. For example, an aggregated particle has characteristics that are averages of the characteristics for the particles in the in the corresponding cluster. That is, the aggregated particle has characteristics that are averages of distance, color, etc. In particular, the aggregated particle may include a new location that is the average location of the particles in the cluster. The aggregated particle may have an aggregated mass, which is determined by summing the masses of the particles in the corresponding cluster. A new color for the aggregated light source may be an average or weighted sum of the colors for each particle in the cluster. Still other visual properties are aggregated, to include without limitation: color, alpha value, material, etc.

In addition, the method may include scaling up a size of each of the subset of particles based on a reduction ratio corresponding to the subsystem of particles, as previously described. Further, a color for each of the subsystem of particles may be darkened based on the reduction ratio, for example, by applying a modified alpha value, as previously described. Still other visual properties (e.g., material, etc.) may be modified to maintain the desired perceptual continuity.

At this point, the system of particles is reduced for simulation and rendering. No further reductions are necessary to accommodate for particle systems in the peripheral region. As such, particle systems in the foveal region are simulated and rendered using the full complement of particles. Also, when it is determined that at least a portion of the effect is in the peripheral region, at 550 the method includes rendering the subset of particle geometries corresponding to the subsystem of particles through the remaining stages of the graphics pipeline.

Figure 6:
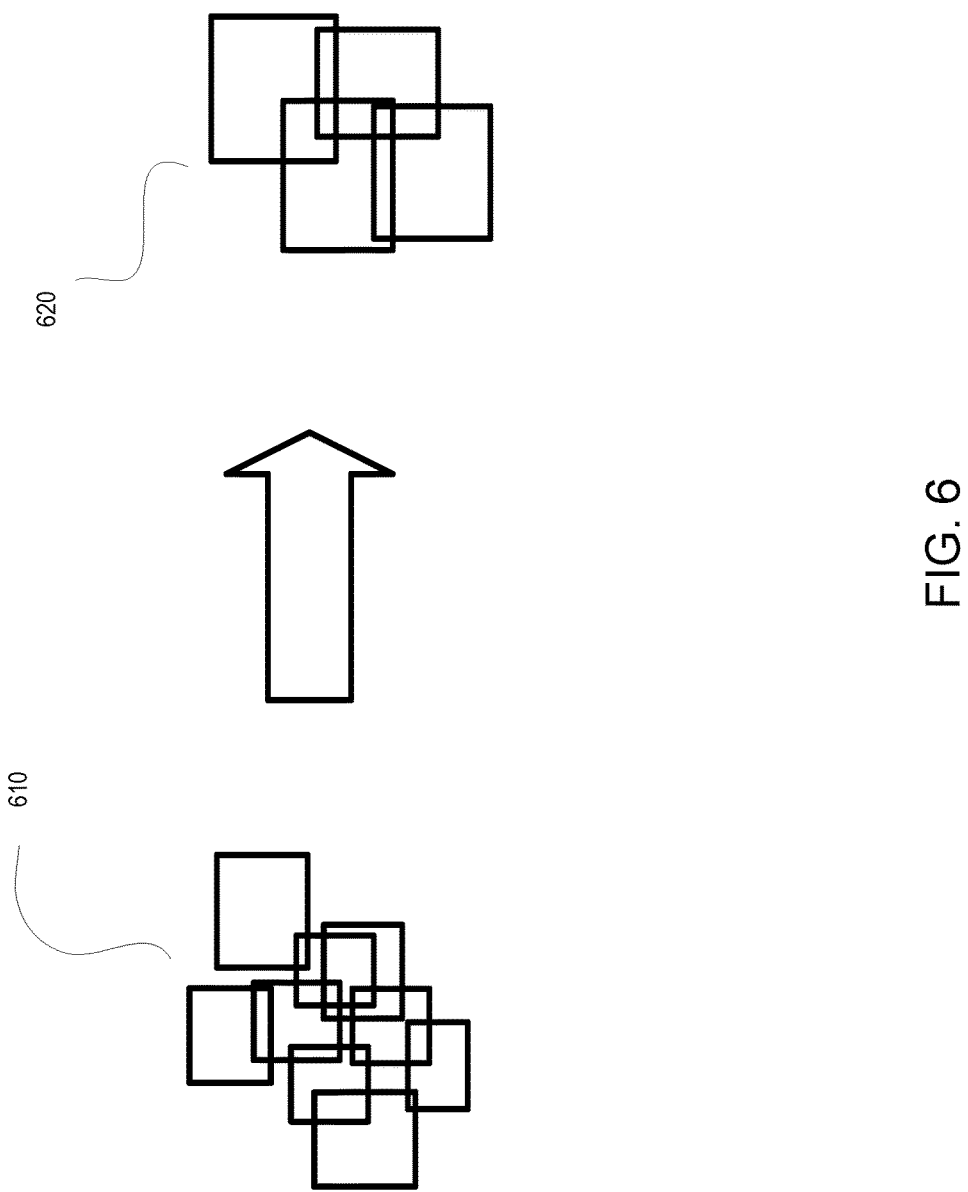
FIG. 6 is an illustration of the generation of a subsystem of particles from a system of particles used to simulate an effect in an image, in accordance with one embodiment of the present disclosure.

FIG. 6 is an illustration of the generation of a subsystem of particles 620 from a system of particles 610 used to simulate an effect in an image, in accordance with one embodiment of the present disclosure. Particle systems can be used to create numerous types of physical and non-physical effects, such as fire, smoke, rocket exhaust, water, magical spells, etc. As shown, the system of particles 610 includes a plurality of particles. For example, a small system may include up to approximately ten thousand particles, while a larger system may include more than ten thousand particles (e.g., millions). The system of particles, is simulated and/or rendered differently depending on whether the effect generated by the particle system is displayed inside or outside a foveal region of an image, as previously described. In particular, when the effect is in the peripheral region, a subsystem of particles 610 is simulated and/or rendered. As shown, the subsystem of particles 610 has a reduced number of particles. For example, the subsystem of particles 610 may be reduced through random selection (e.g., random selection of indices), or through clustering and aggregation. As such, the computation required for rendering the effect produced by the particle system in a peripheral region of the corresponding image is lessened by simulating and/or rendering the subsystem of particles.

While specific embodiments have been provided to demonstrate the implementation of a graphics processor of a video rendering system that is configured to perform foveated rendering, wherein portions of images in a foveal region are rendered with high resolution (e.g., simulating and/or rendering particle systems using a full complement of particles), and portions in the peripheral region are rendered with lower resolution (e.g., simulating and/or rendering particle systems using a subsystem of particles), these are described by way of example and not by way of limitation. Those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A Game Processing Server (GPS) (or simply a "game server") is used by game clients to play single and multiplayer video games. Most video games played over the Internet operate via a connection to the game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices to exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by a software company that owns the game title, allowing them to control and update content.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

It should be understood that the embodiments described herein may be executed on any type of client device. In some embodiments, the client device is a head mounted display (HMD).

Figure 7:
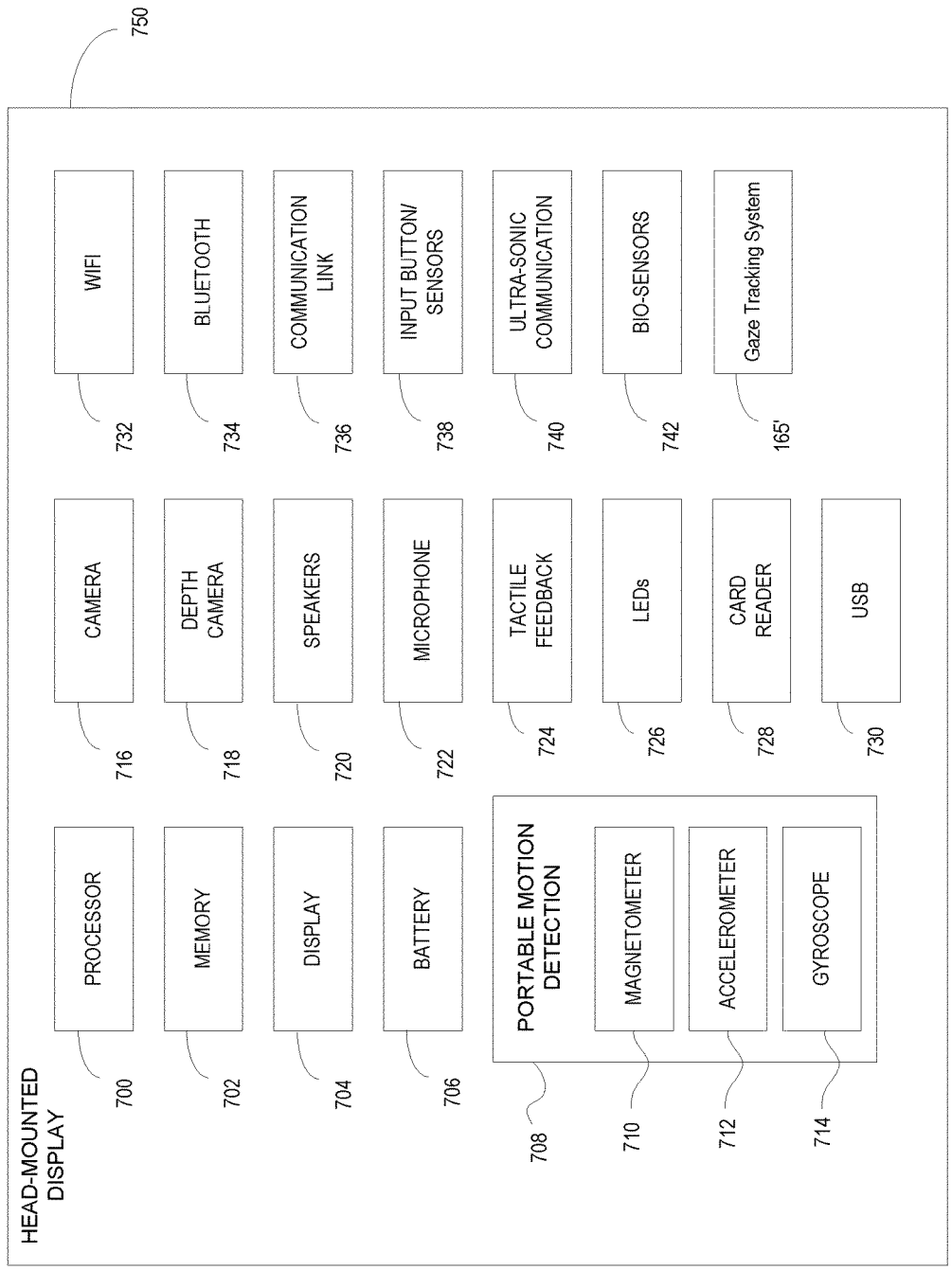
FIG. 7 is a diagram illustrating components of a head-mounted display, in accordance with an embodiment of the disclosure.

FIG. 7, a diagram illustrating components of a head-mounted display 102 is shown, in accordance with an embodiment of the disclosure. The head-mounted display 102 includes a processor 700 for executing program instructions. A memory 702 is provided for storage purposes, and may include both volatile and non-volatile memory. A display 704 is included which provides a visual interface that a user may view. A battery 706 is provided as a power source for the head-mounted display 102. A motion detection module 708 may include any of various kinds of motion sensitive hardware, such as a magnetometer 710A, an accelerometer 712, and a gyroscope 714.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 712 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 710A are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 712 is used together with magnetometer 710A to obtain the inclination and azimuth of the head-mounted display 102.

A gyroscope is a device for measuring or maintaining orientation, based on the principles of angular momentum. In one embodiment, three gyroscopes 714 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 716 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 718 may be included in the head-mounted display 102 for sensing depth information of objects in a real environment.

In one embodiment, a camera integrated on a front face of the HMD may be used to provide warnings regarding safety. For example, if the user is approaching a wall or object, the user may be warned. In one embodiment, the use may be provided with an outline view of physical objects in the room, to warn the user of their presence. The outline may, for example, be an overlay in the virtual environment. In some embodiments, the HMD user may be provided with a view to a reference marker, that is overlaid in, for example, the floor. For instance, the marker may provide the user a reference of where the center of the room is, which in which the user is playing the game. This may provide, for example, visual information to the user of where the user should move to avoid hitting a wall or other object in the room. Tactile warnings can also be provided to the user, and/or audio warnings, to provide more safety for when the user wears and plays games or navigates content with an HMD.

The head-mounted display 102 includes speakers 720 for providing audio output. Also, a microphone 722 may be included for capturing audio from the real environment, including sounds from the ambient environment, speech made by the user, etc. The head-mounted display 102 includes tactile feedback module 724 for providing tactile feedback to the user. In one embodiment, the tactile feedback module 724 is capable of causing movement and/or vibration of the head-mounted display 102 so as to provide tactile feedback to the user.

LEDs 726 are provided as visual indicators of statuses of the head-mounted display 102. For example, an LED may indicate battery level, power on, etc. A card reader 728 is provided to enable the head-mounted display 102 to read and write information to and from a memory card. A USB interface 730 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A Wi-Fi module 732 is included for enabling connection to the Internet via wireless networking technologies. Also, the head-mounted display 102 includes a Bluetooth module 734 for enabling wireless connection to other devices. A communications link 736 may also be included for connection to other devices. In one embodiment, the communications link 736 utilizes infrared transmission for wireless communication. In other embodiments, the communications link 736 may utilize any of various wireless or wired transmission protocols for communication with other devices.

Input buttons/sensors 738 are included to provide an input interface for the user. Any of various kinds of input interfaces may be included, such as buttons, touchpad, joystick, trackball, etc. An ultra-sonic communication module 740 may be included in head-mounted display 102 for facilitating communication with other devices via ultra-sonic technologies.

Bio-sensors 742 are included to enable detection of physiological data from a user. In one embodiment, the bio-sensors 742 include one or more dry electrodes for detecting bio-electric signals of the user through the user's skin.

Photo-sensors 744 are included to respond to signals from emitters (e.g., infrared base stations) placed in a 3-dimensional physical environment. The gaming console analyzes the information from the photo-sensors 744 and emitters to determine position and orientation information related to the head-mounted display 102.

In addition, gaze tracking system 165' is included and configured to to enable tracking of the gaze of the user. For example, system 165' may include gaze tracking cameras which captures images of the user's eyes, which are then analyzed to determine the gaze direction of the user. In one embodiment, information about the gaze direction of the user can be utilized to affect the video rendering. Video rendering in the direction of gaze can be prioritized or emphasized, such as by providing greater detail, higher resolution through foveated rendering, higher resolution of a particle system effect displayed in the foveal region, lower resolution of a particle system effect displayed outside the foveal region, or faster updates in the region where the user is looking.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

It will be appreciated by those skilled in the art that in various embodiments of the disclosure, the aforementioned handheld device may be utilized in conjunction with an interactive application displayed on a display to provide various interactive functions. The exemplary embodiments described herein are provided by way of example only, and not by way of limitation.

Figure 8:
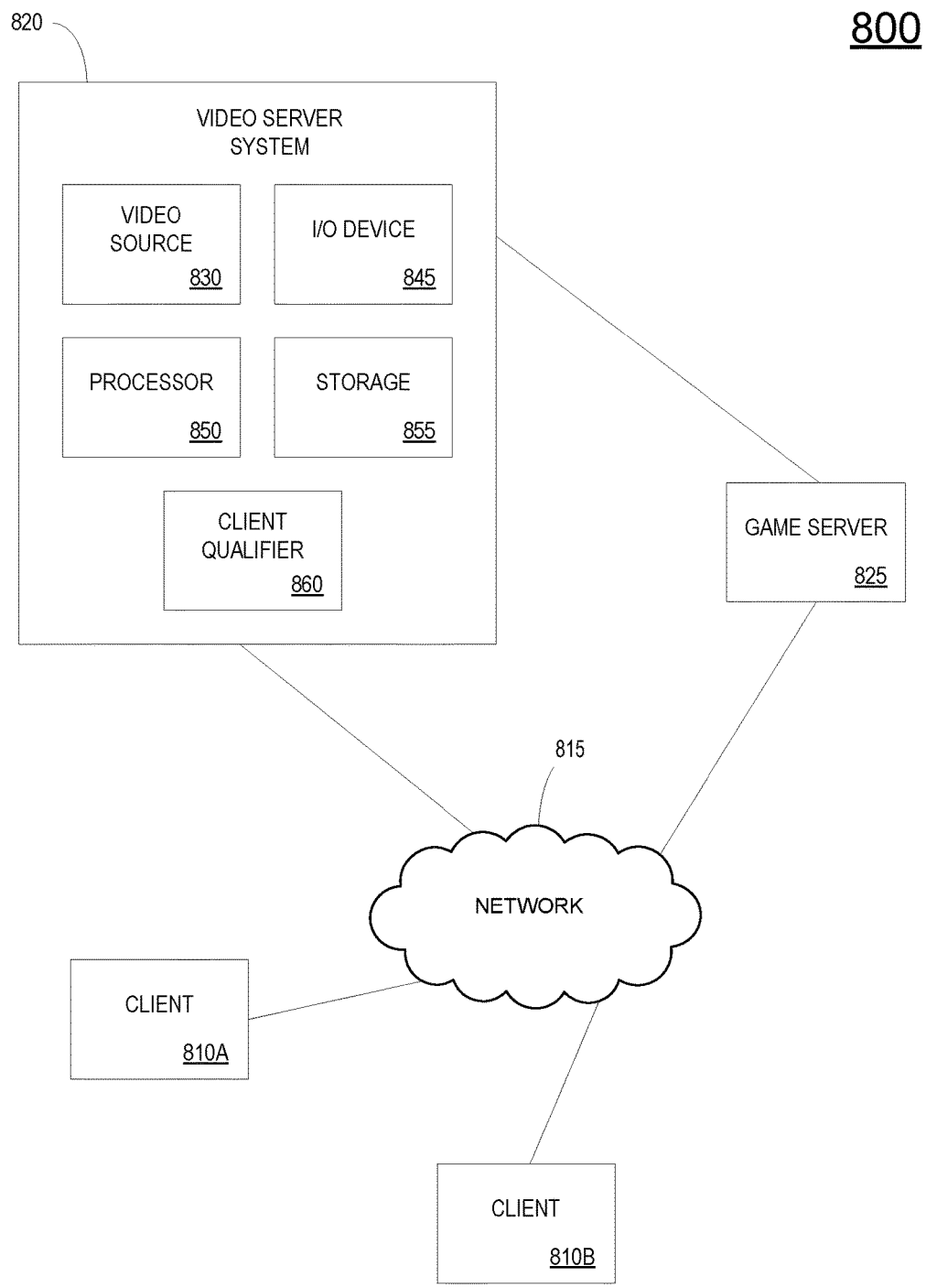
FIG. 8 is a block diagram of a Game System, according to various embodiments of the disclosure.

FIG. 8 is a block diagram of a Game System 800, according to various embodiments of the disclosure. Game System 800 is configured to provide a video stream to one or more Clients 810 via a Network 815. Game System 800 typically includes a Video Server System 820 and an optional game server 825. Video Server System 820 is configured to provide the video stream to the one or more Clients 810 with a minimal quality of service. For example, Video Server System 820 may receive a game command that changes the state of or a point of view within a video game, and provide Clients 810 with an updated video stream reflecting this change in state with minimal lag time. The Video Server System 820 may be configured to provide the video stream in a wide variety of alternative video formats, including formats yet to be defined. Further, the video stream may include video frames configured for presentation to a user at a wide variety of frame rates. Typical frame rates are 30 frames per second, 80 frames per second, and 820 frames per second. Although higher or lower frame rates are included in alternative embodiments of the disclosure.

Clients 810, referred to herein individually as 810A, 810B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 810 are configured to receive encoded video streams (i.e., compressed), decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 810 or on a separate device such as a monitor or television. Clients 810 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 810 are optionally geographically dispersed. The number of clients included in Game System 800 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 820 to deliver a game viewed through the HMD. In one embodiment, the game console receives the video stream from the video server system 820, and the game console forwards the video stream, or updates to the video stream, to the HMD for rendering.

Clients 810 are configured to receive video streams via Network 815. Network 815 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 810 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 810 may, but are not required to, further include systems configured for modifying received video. For example, a client may be configured to perform further rendering, to overlay one video image on another video image, to crop a video image, and/or the like. For example, Clients 810 may be configured to receive various types of video frames, such as I-frames, P-frames and B-frames, and to process these frames into images for display to a user. In some embodiments, a member of Clients 810 is configured to perform further rendering, shading, conversion to 3-D, or like operations on the video stream. A member of Clients 810 is optionally configured to receive more than one audio or video stream. Input devices of Clients 810 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 810 is generated and provided by Video Server System 820. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 810 are typically configured to receive inputs from a user. These inputs may include game commands configured to change the state of the video game or otherwise affect gameplay. The game commands can be received using input devices and/or may be automatically generated by computing instructions executing on Clients 810. The received game commands are communicated from Clients 810 via Network 815 to Video Server System 820 and/or Game Server 825. For example, in some embodiments, the game commands are communicated to Game Server 825 via Video Server System 820. In some embodiments, separate copies of the game commands are communicated from Clients 810 to Game Server 825 and Video Server System 820. The communication of game commands is optionally dependent on the identity of the command Game commands are optionally communicated from Client 810A through a different route or communication channel that that used to provide audio or video streams to Client 810A.

Game Server 825 is optionally operated by a different entity than Video Server System 820. For example, Game Server 825 may be operated by the publisher of a multi-player game. In this example, Video Server System 820 is optionally viewed as a client by Game Server 825 and optionally configured to appear from the point of view of Game Server 825 to be a prior art client executing a prior art game engine. Communication between Video Server System 820 and Game Server 825 optionally occurs via Network 815. As such, Game Server 825 can be a prior art multiplayer game server that sends game state information to multiple clients, one of which is game server system 820. Video Server System 820 may be configured to communicate with multiple instances of Game Server 825 at the same time. For example, Video Server System 820 can be configured to provide a plurality of different video games to different users. Each of these different video games may be supported by a different Game Server 825 and/or published by different entities. In some embodiments, several geographically distributed instances of Video Server System 820 are configured to provide game video to a plurality of different users. Each of these instances of Video Server System 820 may be in communication with the same instance of Game Server 825. Communication between Video Server System 820 and one or more Game Server 825 optionally occurs via a dedicated communication channel. For example, Video Server System 820 may be connected to Game Server 825 via a high bandwidth channel that is dedicated to communication between these two systems.

Video Server System 820 comprises at least a Video Source 830, an I/O Device 845, a Processor 850, and non-transitory Storage 855. Video Server System 820 may include one computing device or be distributed among a plurality of computing devices. These computing devices are optionally connected via a communications system such as a local area network.

Video Source 830 is configured to provide a video stream, e.g., streaming video or a series of video frames that form a moving picture. In some embodiments, Video Source 830 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects.

The game state is typically maintained based on game rules, as well as game commands such as move, turn, attack, set focus to, interact, use, and/or the like. Part of the game engine is optionally disposed within Game Server 825. Game Server 825 may maintain a copy of the state of the game based on game commands received from multiple players using geographically disperse clients. In these cases, the game state is provided by Game Server 825 to Video Source 830, wherein a copy of the game state is stored and rendering is performed. Game Server 825 may receive game commands directly from Clients 810 via Network 815, and/or may receive game commands via Video Server System 820.

Video Source 830 typically includes rendering logic, e.g., hardware, firmware, and/or software stored on a computer readable medium such as Storage 855. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 810. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 830 includes a video recording device such as a camera. This camera may be used to generate delayed or live video that can be included in the video stream of a computer game. The resulting video stream optionally includes both rendered images and images recorded using a still or video camera. Video Source 830 may also include storage devices configured to store previously recorded video to be included in a video stream. Video Source 830 may also include motion or positioning sensing devices configured to detect motion or position of an object, e.g., person, and logic configured to determine a game state or produce video-based on the detected motion and/or position.

Video Source 830 is optionally configured to provide overlays configured to be placed on other video. For example, these overlays may include a command interface, log in instructions, messages to a game player, images of other game players, video feeds of other game players (e.g., webcam video). In embodiments of Client 810A including a touch screen interface or a gaze detection interface, the overlay may include a virtual keyboard, joystick, touch pad, and/or the like. In one example of an overlay a player's voice is overlaid on an audio stream. Video Source 830 optionally further includes one or more audio sources.

In embodiments wherein Video Server System 820 is configured to maintain the game state based on input from more than one player, each player may have a different point of view comprising a position and direction of view. Video Source 830 is optionally configured to provide a separate video stream for each player based on their point of view. Further, Video Source 830 may be configured to provide a different frame size, frame data size, and/or encoding to each of Client 810. Video Source 830 is optionally configured to provide 3-D video.

I/O Device 845 is configured for Video Server System 820 to send and/or receive information such as video, commands, requests for information, a game state, gaze information, device motion, device location, user motion, client identities, player identities, game commands, security information, audio, and/or the like. I/O Device 845 typically includes communication hardware such as a network card or modem. I/O Device 845 is configured to communicate with Game Server 825, Network 815, and/or Clients 810.

Processor 850 is configured to execute logic, e.g. software, included within the various components of Video Server System 820 discussed herein. For example, Processor 850 may be programmed with software instructions in order to perform the functions of Video Source 830, Game Server 825, and/or a Client Qualifier 860. Video Server System 820 optionally includes more than one instance of Processor 850. Processor 850 may also be programmed with software instructions in order to execute commands received by Video Server System 820, or to coordinate the operation of the various elements of Game System 800 discussed herein. Processor 850 may include one or more hardware device. Processor 850 is an electronic processor.

Storage 855 includes non-transitory analog and/or digital storage devices. For example, Storage 855 may include an analog storage device configured to store video frames. Storage 855 may include a computer readable digital storage, e.g., a hard drive, an optical drive, or solid state storage. Storage 855 is configured (e.g., by way of an appropriate data structure or file system) to store video frames, artificial frames, a video stream including both video frames and artificial frames, audio frame, an audio stream, and/or the like. Storage 855 is optionally distributed among a plurality of devices. In some embodiments, Storage 855 is configured to store the software components of Video Source 830 discussed elsewhere herein. These components may be stored in a format ready to be provisioned when needed.

Video Server System 820 optionally further comprises Client Qualifier 860. Client Qualifier 860 is configured for remotely determining the capabilities of a client, such as Clients 810A or 810B. These capabilities can include both the capabilities of Client 810A itself as well as the capabilities of one or more communication channels between Client 810A and Video Server System 820. For example, Client Qualifier 860 may be configured to test a communication channel through Network 815.

Client Qualifier 860 can determine (e.g., discover) the capabilities of Client 810A manually or automatically. Manual determination includes communicating with a user of Client 810A and asking the user to provide capabilities. For example, in some embodiments, Client Qualifier 860 is configured to display images, text, and/or the like within a browser of Client 810A. In one embodiment, Client 810A is an HMD that includes a browser. In another embodiment, client 810A is a game console having a browser, which may be displayed on the HMD. The displayed objects request that the user enter information such as operating system, processor, video decoder type, type of network connection, display resolution, etc., of Client 810A. The information entered by the user is communicated back to Client Qualifier 860.

Automatic determination may occur, for example, by execution of an agent on Client 810A and/or by sending test video to Client 810A. The agent may comprise computing instructions, such as java script, embedded in a web page or installed as an add-on. The agent is optionally provided by Client Qualifier 860. In various embodiments, the agent can find out processing power of Client 810A, decoding and display capabilities of Client 810A, lag time reliability and bandwidth of communication channels between Client 810A and Video Server System 820, a display type of Client 810A, firewalls present on Client 810A, hardware of Client 810A, software executing on Client 810A, registry entries within Client 810A, and/or the like.

Client Qualifier 860 includes hardware, firmware, and/or software stored on a computer readable medium. Client Qualifier 860 is optionally disposed on a computing device separate from one or more other elements of Video Server System 820. For example, in some embodiments, Client Qualifier 860 is configured to determine the characteristics of communication channels between Clients 810 and more than one instance of Video Server System 820. In these embodiments the information discovered by Client Qualifier can be used to determine which instance of Video Server System 820 is best suited for delivery of streaming video to one of Clients 810.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the invention also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for implementing a graphics pipeline, comprising:
generating a system of particles creating an effect in a virtual scene, the system of particles including a plurality of particle geometries;
determining a subsystem of particles from the system of particles, the subsystem of particles comprising a subset of particle geometries taken from the plurality of particle geometries;
determining a foveal region when rendering an image of the virtual scene, wherein the foveal region corresponds to where an attention of a user is directed;
determining that at least one portion of the effect is located in a peripheral region for the image;
rendering the subsystem of particles to generate the effect;
wherein the determining the subsystem of particles includes:
determining at least one particle of the system of particles is in the peripheral region;
generating a plurality of clusters of particles from the system of particles, wherein each of the clusters is represented by a corresponding aggregated particle, wherein the subsystem of particles includes the aggregated particles of the plurality of clusters of particles; and
simulating the effect using the subsystem of particles;
determining an aggregated location of the corresponding aggregated particle by averaging locations of particles in a corresponding cluster of particles;
determining an aggregated mass of the corresponding aggregated particle by summing masses of particles in the corresponding cluster of particles;
scaling a size of the corresponding aggregated particle based on a reduction ratio corresponding to the subsystem of particles; and
determining aggregated visual properties of the corresponding aggregated particle.

2. The method of claim 1, wherein the determining a subsystem of particles comprises:
inputting a plurality of particle vertices into the graphics pipeline;
generating the plurality of particle geometries from the plurality of particle vertices;
simulating the effect using the plurality of particle geometries;
sampling the system of particles to generate the subsystem of particles; and
rendering the subset of particle geometries corresponding to the subsystem of particles.

3. The method of claim 2, further comprising:
indexing vertices of the plurality of particle geometries;
wherein sampling the plurality of particles includes generating a draw list including the subset of particle geometries to be rendered; and
wherein rendering the subset of particle geometries includes rendering vertices of a first particle geometry when the vertices are associated with an index in the draw list.

4. The method of claim 2, further comprising:
scaling up a size of each of the subsystem of particles based on a reduction ratio corresponding to the subset of particle geometries; and
modifying the visual properties of the particle to maintain a desired perceptual continuity.

5. The method of claim 1, further comprising:
defining a bounding box for the system of particles; and
determining that the bounding box is in the peripheral region.

6. The method of claim 1, further comprising:
generating the plurality of clusters of particles using a nearest neighbor search or a k-means clustering technique.

7. A computer system comprising:
a processor;
memory coupled to the processor and having stored therein instructions that, if executed by the computer system, cause the computer system to execute a method for implementing a graphics pipeline, comprising:
generating a system of particles creating an effect in a virtual scene, the system of particles comprising a plurality of particle geometries;
determining a subsystem of particles from the system of particles, the subsystem of particles including a subset of particle geometries taken from the plurality of particle geometries;
determining a foveal region when rendering an image of the virtual scene, wherein the foveal region corresponds to where an attention of a user is directed;
determining that at least one portion of the effect is located in a peripheral region for the image;
rendering the subsystem of particles to generate the effect;
wherein the determining the subsystem of particles in the method includes:
determining at least one particle of the system of particles is in the peripheral region;
generating a plurality of clusters of particles from the system of particles, wherein each of the clusters is represented by a corresponding aggregated particle, wherein the subsystem of particles includes the aggregated particles of the plurality of clusters of particles; and
simulating the effect using the subsystem of particles;
determining an aggregated location of the corresponding aggregated particle by averaging locations of particles in a corresponding cluster of particles;
determining an aggregated mass of the corresponding aggregated particle by summing masses of particles in the corresponding cluster of particles;

scaling a size of the corresponding aggregated particle based on a reduction ratio corresponding to the subsystem of particles; and
determining aggregated visual properties of the corresponding aggregated particle.

8. The computer system of claim 7, wherein the determining a subsystem of particles in the method comprises:
inputting a plurality of particle vertices into the graphics pipeline;
generating the plurality of particle geometries from the plurality of particle vertices;
simulating the effect using the plurality of particle geometries;
sampling the system of particles to generate the subsystem of particles; and
rendering the subset of particle geometries corresponding to the subsystem of particles.

9. The computer system of claim 8, wherein the method further comprises:
indexing vertices of the plurality of particle geometries;
wherein sampling the system of particles includes generating a draw list including the subset of particle geometries to be rendered;
wherein rendering the subset of particle geometries includes rendering vertices of a first particle geometry when the vertices are associated with an index in the draw list.

10. The computer system of claim 8, wherein the method further comprises:
scaling up a size of each of the subsystem of particles based on a reduction ratio corresponding to the subset of particle geometries; and
modify the visual properties of the particle to maintain a desired perceptual continuity.

11. The computer system of claim 7, wherein the method further comprises:
defining a bounding box for the system of particles; and
determining that the bounding box is in the peripheral region.

12. The computer system of claim 7, wherein the method further comprises:
generating the plurality of clusters of particles using a nearest neighbor search or a k-means clustering technique.

13. A non-transitory computer-readable medium storing a computer program for implementing a graphics pipeline, the computer-readable medium comprising:
program instructions for generating a system of particles creating an effect in a virtual scene, the system of particles comprising a plurality of particle geometries;
program instructions for determining a subsystem of particles from the system of particles, the subsystem of particles including a subset of particle geometries taken from the plurality of particle geometries;
program instructions for determining a foveal region when rendering an image of the virtual scene, wherein the foveal region corresponds to where an attention of a user is directed;
program instructions for determining that at least one portion of the effect is located in a peripheral region for the image;
program instructions for rendering the subsystem of particles to generate the effect;
wherein program instructions for determining the subsystem of particles includes:
program instructions for determining at least one particle of the system of particles is in the peripheral region;
program instructions for generating a plurality of clusters of particles from the system of particles, wherein each of the clusters is represented by a corresponding aggregated particle, wherein the subsystem of particles includes the aggregated particles of the plurality of clusters of particles; and
program instructions for simulating the effect using the subsystem of particles;
program instructions for determining an aggregated location of the corresponding aggregated particle by averaging locations of particles in a corresponding cluster of particles;
program instructions for determining an aggregated mass of the corresponding aggregated particle by summing masses of particles in the corresponding cluster of particles;
program instructions for scaling a size of the corresponding aggregated particle based on a reduction ratio corresponding to the subsystem of particles; and
program instructions for determining aggregated visual properties of the corresponding aggregated particle.

14. The computer-readable medium of claim 13, wherein program instructions for determining a subsystem of particles comprises:
program instructions for inputting a plurality of particle vertices into the graphics pipeline;
program instructions for generating the plurality of particle geometries from the plurality of particle vertices;
program instructions for simulating the effect using the plurality of particle geometries;
program instructions for sampling the system of particles to generate the subsystem of particles; and
program instructions for rendering the subset of particle geometries corresponding to the subsystem of particles.

15. The computer-readable medium of claim 14, further comprising:
program instructions for indexing vertices of the plurality of particle geometries;
wherein program instructions for sampling the system of particles includes program instructions for generating a draw list including the subset of particle geometries to be rendered;
wherein program instructions for rendering the subset of particle geometries includes program instructions for rendering vertices of a first particle geometry when the vertices are associated with an index in the draw list;
program instructions for scaling up a size of each of the subsystem of particles based on a reduction ratio corresponding to the subset of particle geometries; and
program instructions for modifying the visual properties of the particle to maintain a desired perceptual continuity.

16. The computer-readable medium of claim 13, further comprising:
program instructions for defining a bounding box for the system of particles; and
program instructions for determining that the bounding box is in the peripheral region.

17. The computer-readable medium of claim 13, further comprising:
program instructions for generating the plurality of clusters of particles using a nearest neighbor search or a k-means clustering technique.

18. A method for implementing a graphics pipeline, comprising:
- generating a system of particles creating an effect in a virtual scene, the system of particles comprising a plurality of particle geometries;
- determining a subsystem of particles from the system of particles, the subsystem of particles including a subset of particle geometries taken from the plurality of particle geometries;
- determining a foveal region when rendering an image of the virtual scene, wherein the foveal region corresponds to where an attention of a user is directed;
- determining that at least one portion of the effect is located in a peripheral region for the image;
- rendering the subsystem of particles to generate the effect;
- wherein the determining the subsystem of particles includes:
  - inputting a plurality of particle vertices into the graphics pipeline;
  - generating the plurality of particle geometries from the plurality of particle vertices;
  - simulating the effect using the plurality of particle geometries;
  - sampling the plurality of particles to generate the subsystem of particles; and
  - rendering the subset of particle geometries corresponding to the subsystem of particles;
- scaling up a size of each of the subsystem of particles based on a reduction ratio corresponding to the subset; and
- modifying the visual properties of the particle to maintain a desired perceptual continuity.

19. A method for implementing a graphics pipeline, comprising:
- generating a system of particles creating an effect in a virtual scene, the system of particles comprising a plurality of particle geometries;
- determining a subsystem of particles from the system of particles, the subsystem of particles including a subset of particle geometries taken from the plurality of particle geometries;
- determining a foveal region when rendering an image of the virtual scene, wherein the foveal region corresponds to where an attention of a user is directed;
- determining that at least one portion of the effect is located in a peripheral region for the image;
- rendering the subsystem of particles to generate the effect;
- wherein the determining the subsystem of particles includes:
  - inputting a plurality of particle vertices into the graphics pipeline;
  - generating the plurality of particle geometries from the plurality of particle vertices;
  - simulating the effect using the plurality of particle geometries;
  - sampling the plurality of particles to generate the subsystem of particles; and
  - rendering the subset of particle geometries corresponding to the subsystem of particles;
- indexing vertices of the plurality of particle geometries;
- wherein sampling the plurality of particles includes generating a draw list including the subset of particle geometries to be rendered; and
- wherein rendering the subset of particle geometries includes rendering vertices of first particle geometry when the vertices are associated with an index in the draw list.

* * * * *